(12) United States Patent
Roos

(10) Patent No.: US 8,963,356 B2
(45) Date of Patent: Feb. 24, 2015

(54) POWER CONVERSION AND ENERGY STORAGE DEVICE

(75) Inventor: Paul W. Roos, Delray Beach, FL (US)

(73) Assignee: America Hydro Jet Corporation, Racine, WI (US)

(*) Notice: Subject to any disclaimer, the term of this patent is extended or adjusted under 35 U.S.C. 154(b) by 448 days.

(21) Appl. No.: 13/356,288

(22) Filed: Jan. 23, 2012

(65) Prior Publication Data

US 2012/0169054 A1 Jul. 5, 2012

Related U.S. Application Data

(63) Continuation-in-part of application No. 12/691,456, filed on Jan. 21, 2010, now Pat. No. 8,536,723.

(51) Int. Cl.

| | |
|---|---|
| *F03B 13/08* | (2006.01) |
| *F03B 3/04* | (2006.01) |
| *F03B 3/18* | (2006.01) |
| *H02K 1/14* | (2006.01) |
| *H02K 1/27* | (2006.01) |
| *H02K 5/08* | (2006.01) |
| *H02K 5/12* | (2006.01) |
| *H02K 7/08* | (2006.01) |
| *H02K 7/14* | (2006.01) |
| *H02K 7/18* | (2006.01) |
| *H02K 11/00* | (2006.01) |
| *H02K 11/04* | (2006.01) |
| *H02K 5/20* | (2006.01) |
| *H02K 9/19* | (2006.01) |

(52) U.S. Cl.
CPC ... *F03B 3/04* (2013.01); *F03B 3/18* (2013.01); *F03B 13/083* (2013.01); *H02K 1/148* (2013.01); *H02K 1/278* (2013.01); *H02K 5/08* (2013.01); *H02K 5/12* (2013.01); *H02K 7/086* (2013.01); *H02K 7/088* (2013.01); *H02K 7/14* (2013.01); *H02K 7/1823* (2013.01); *H02K 11/0073* (2013.01); *H02K 11/0094* (2013.01); *H02K 11/046* (2013.01); *H02K 5/20* (2013.01); *H02K 9/19* (2013.01); *H02K 2213/12* (2013.01); *Y02E 10/223* (2013.01); *Y02E 10/22* (2013.01)
USPC .............................................. 290/52; 290/54

(58) Field of Classification Search
CPC ............ F03B 13/083; F03B 3/04; F03B 3/18; F05B 2240/133; Y02E 10/223
See application file for complete search history.

(56) References Cited

U.S. PATENT DOCUMENTS

| | | |
|---|---|---|
| 2,246,472 A | 6/1941 | Sharp |
| 2,949,540 A | 8/1960 | Clayton |

(Continued)

*Primary Examiner* — Michael Zarroli
(74) *Attorney, Agent, or Firm* — Jansson Munger McKinley & Shape Ltd.

(57) ABSTRACT

Power conversion device including: a first fluid conduit; a diffuser attached thereto with at least one vane supporting a diffuser hub; a rotor supported by the diffuser hub and having a rotor blade, hub, and shroud at the periphery thereof with at least one magnet thereon; a housing surrounding the shroud and attached to the diffuser, and having a stator including laminations forming poles and at least one coil therearound, the stator encapsulated in a non-metallic compound to prevent fluid contact with laminations and coil(s); a commutation control connected to the coil(s) and having external leads; and a second fluid conduit attached to the housing so fluid flow causes a torque load on the blades, rotating the rotor and inducing a magnetic field in the poles to generate current in the coil, converting hydraulic power to electric power. The device operates as a turbine/generator and as a motor/pump.

69 Claims, 18 Drawing Sheets

SECTION AA

(56) References Cited

U.S. PATENT DOCUMENTS

| | | | |
|---|---|---|---|
| 4,364,228 A | 12/1982 | Eller | |
| 4,558,228 A | 12/1985 | Larjola | |
| 5,490,768 A * | 2/1996 | Veronesi et al. | 417/356 |
| 6,015,272 A * | 1/2000 | Antaki et al. | 417/356 |
| 6,407,466 B2 | 6/2002 | Caamano | |
| 6,566,764 B2 * | 5/2003 | Rebsdorf et al. | 290/44 |
| 6,995,479 B2 | 2/2006 | Tharp | |
| 7,021,905 B2 * | 4/2006 | Torrey et al. | 417/356 |
| 7,235,894 B2 | 6/2007 | Roos | |
| 7,385,303 B2 | 6/2008 | Roos | |
| 7,902,687 B2 * | 3/2011 | Sauer et al. | 290/54 |
| 2001/0037651 A1 | 11/2001 | Butterworth et al. | |
| 2002/0024216 A1 | 2/2002 | Rose et al. | |
| 2008/0088135 A1 | 4/2008 | Vidal | |
| 2009/0134623 A1 | 5/2009 | Krouse | |
| 2010/0038910 A1 | 2/2010 | Da Silva | |
| 2010/0096284 A1 | 4/2010 | Bau | |
| 2010/0181771 A1 | 7/2010 | Roos | |
| 2012/0007364 A1 | 1/2012 | David | |
| 2013/0277980 A1 * | 10/2013 | Kiyose et al. | 290/54 |
| 2013/0334824 A1 * | 12/2013 | Freda | 290/55 |

* cited by examiner

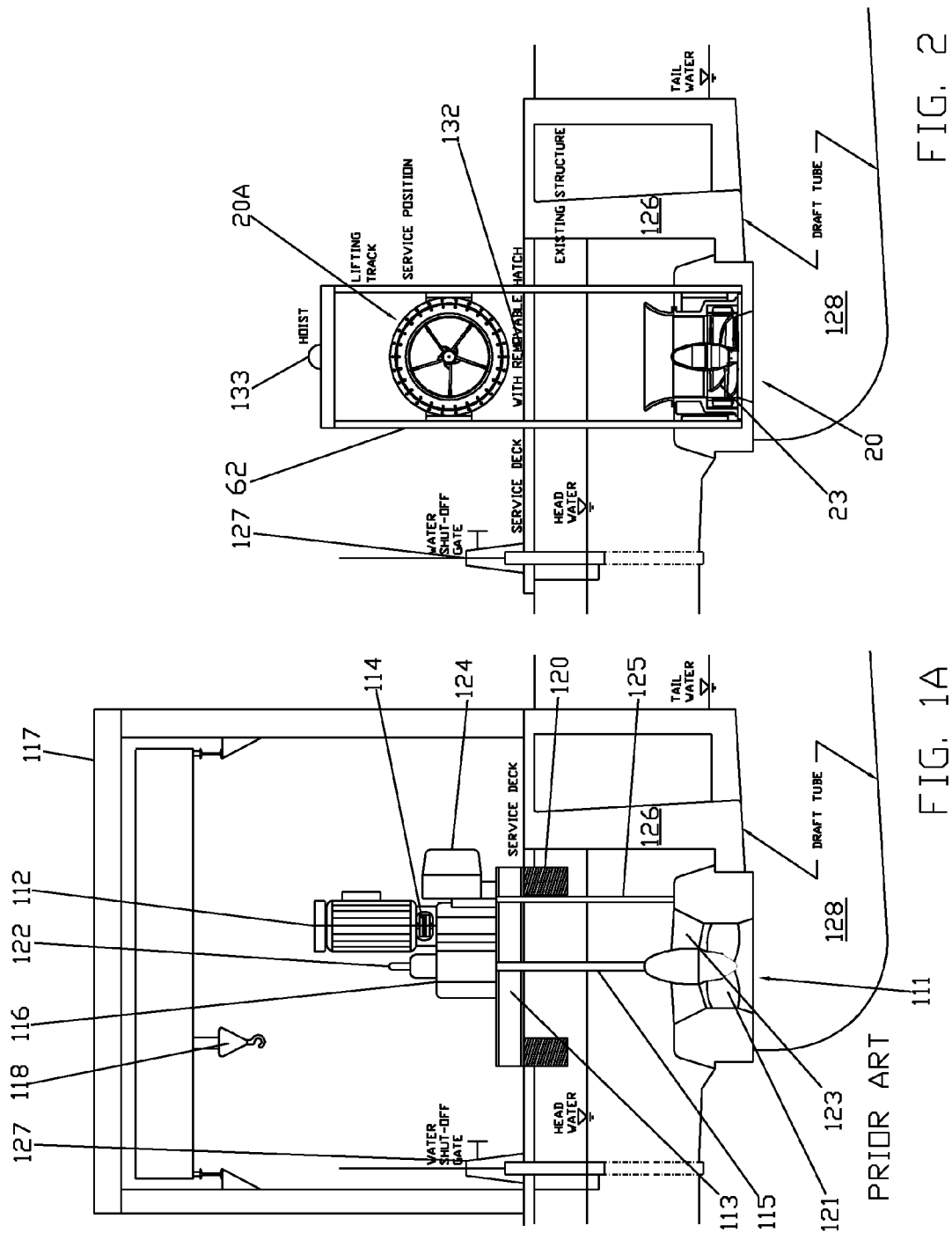

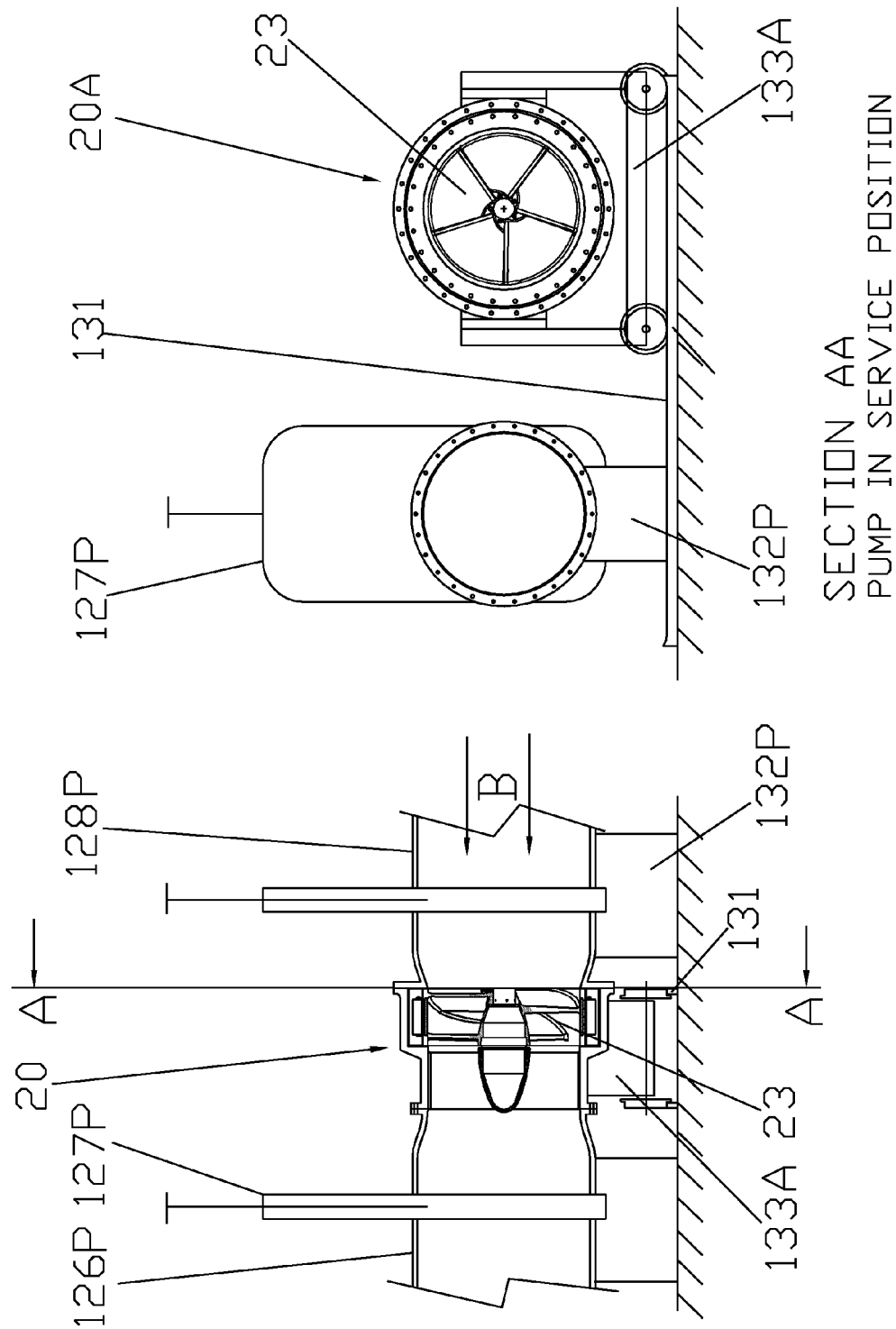

SECTION AA

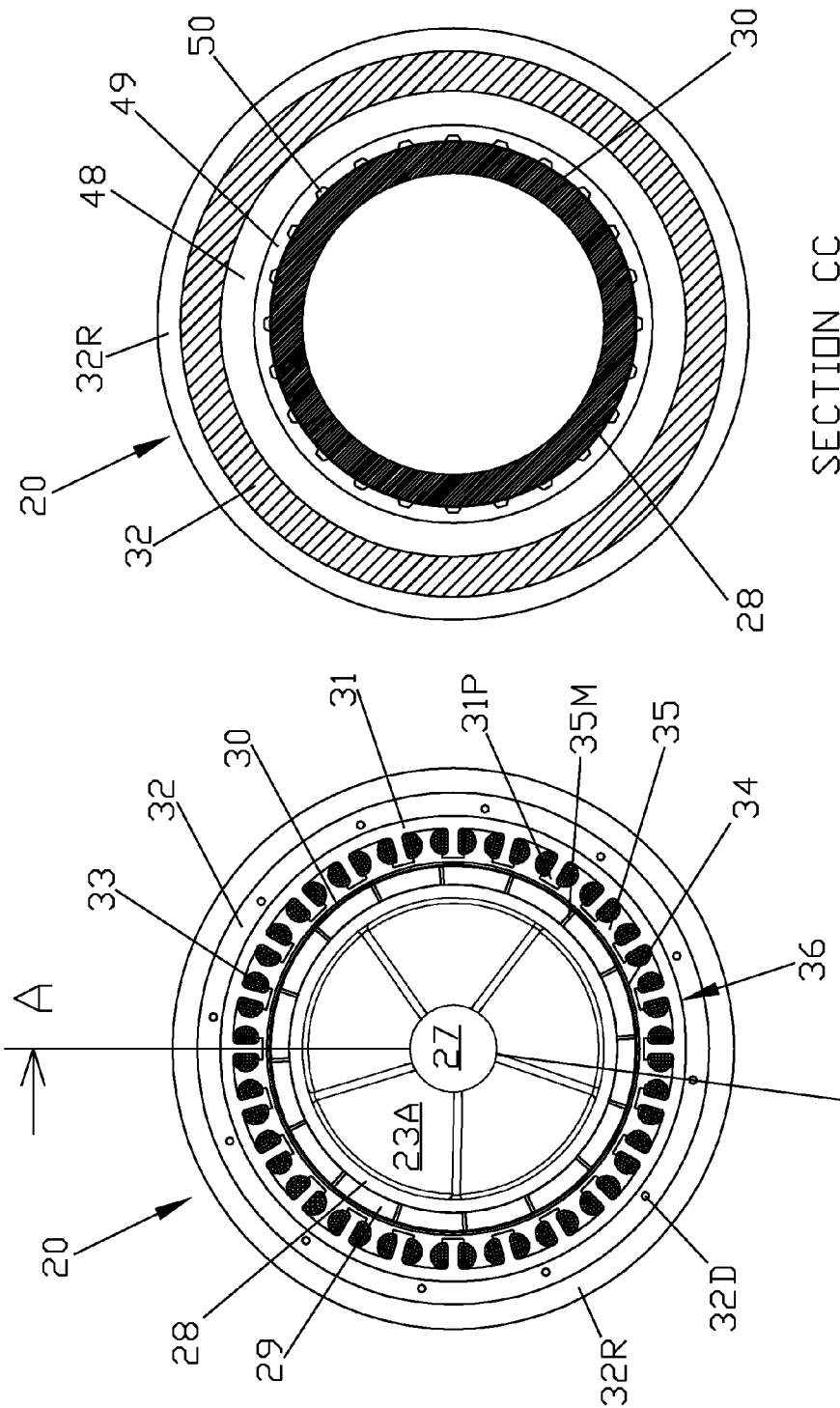

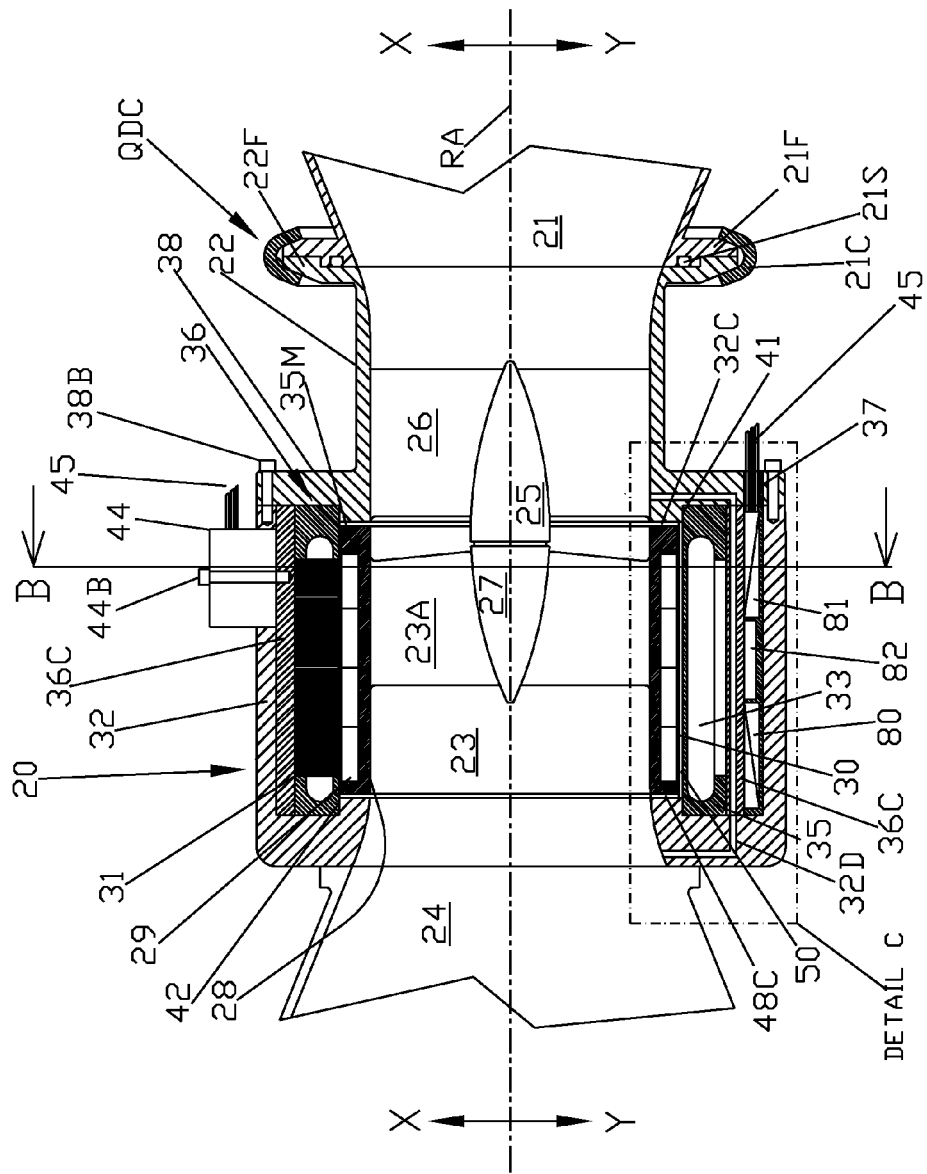

SECTION BB

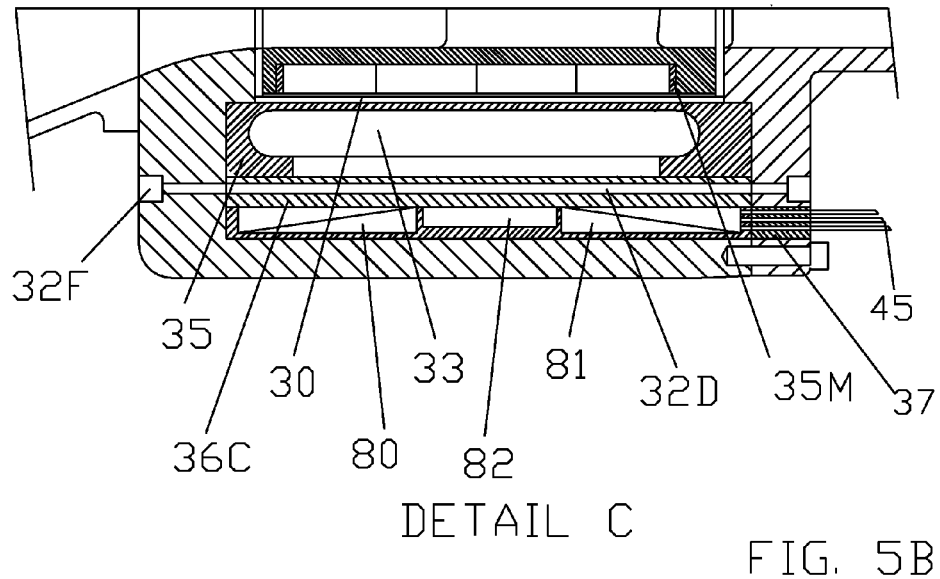
DETAIL C
FIG. 5B
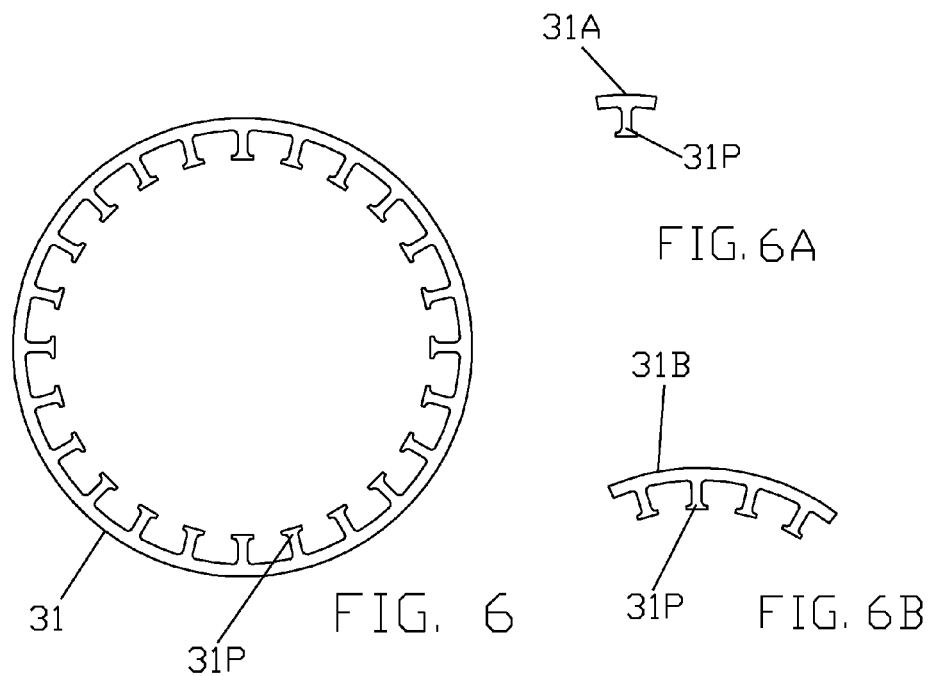
FIG. 6A
FIG. 6
FIG. 6B

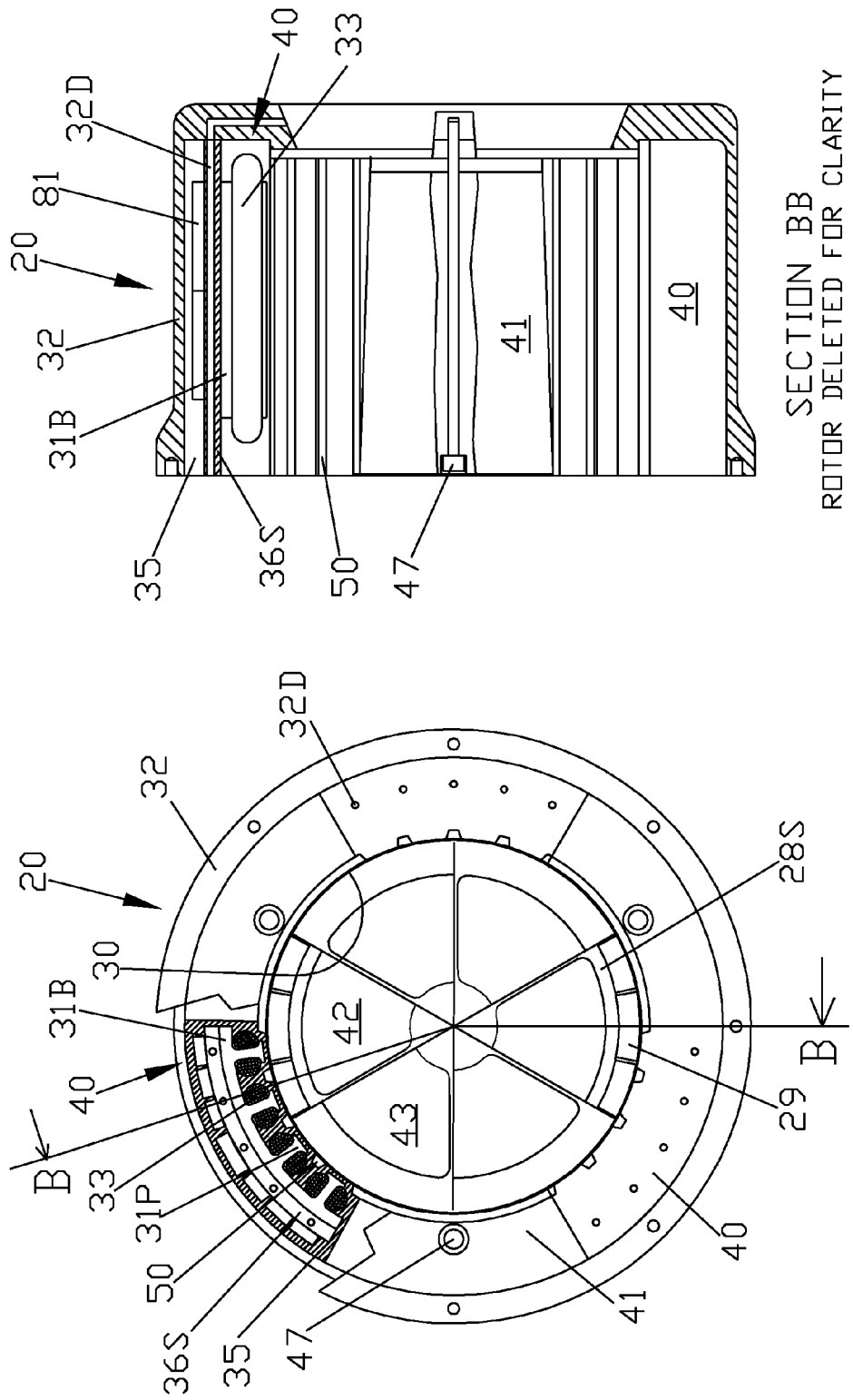

SECTION AA

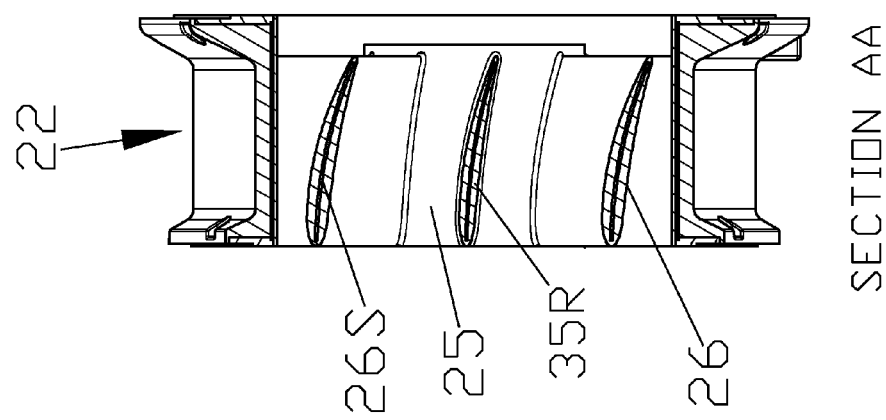
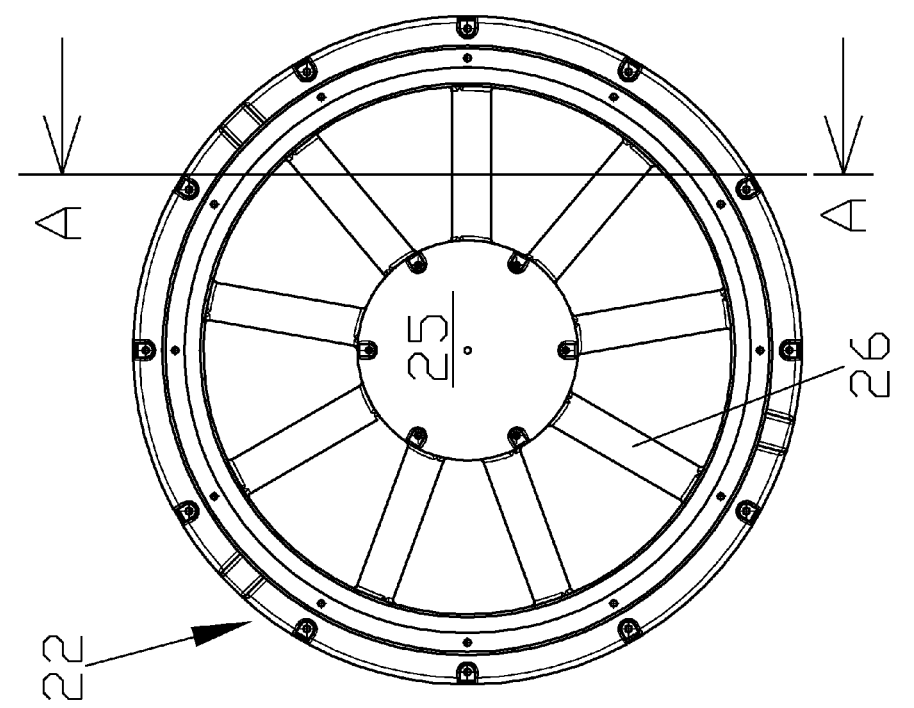

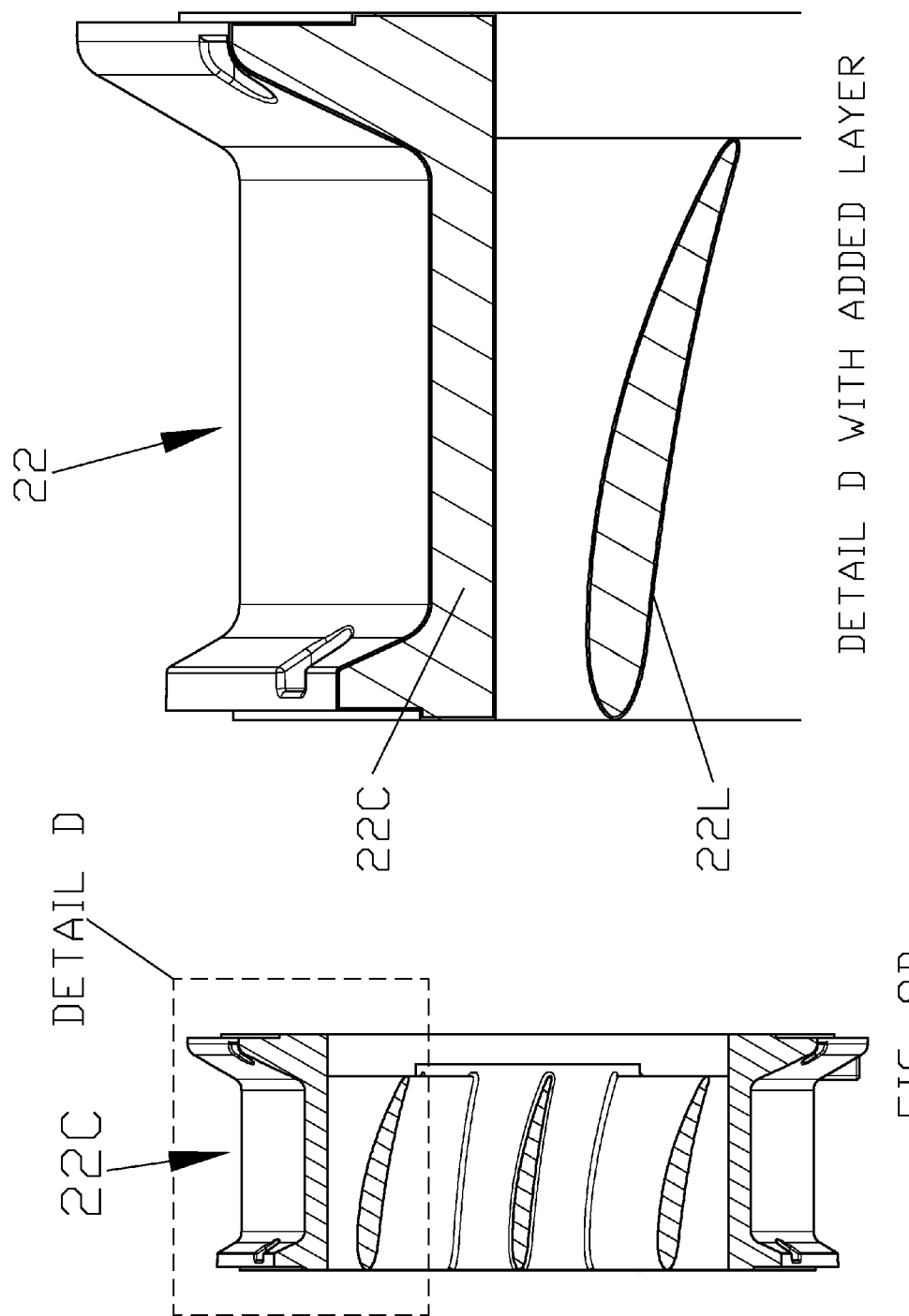

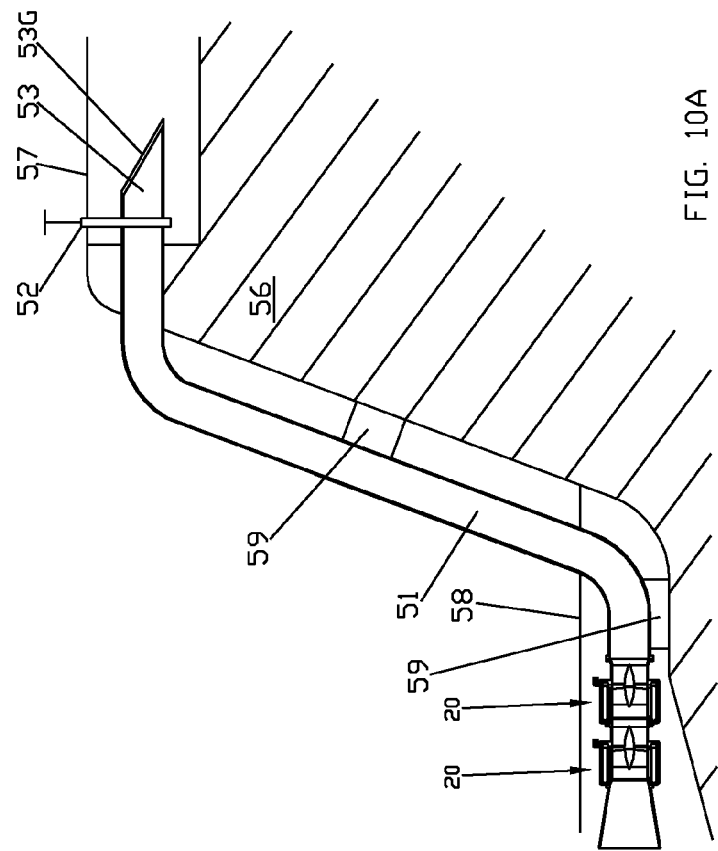
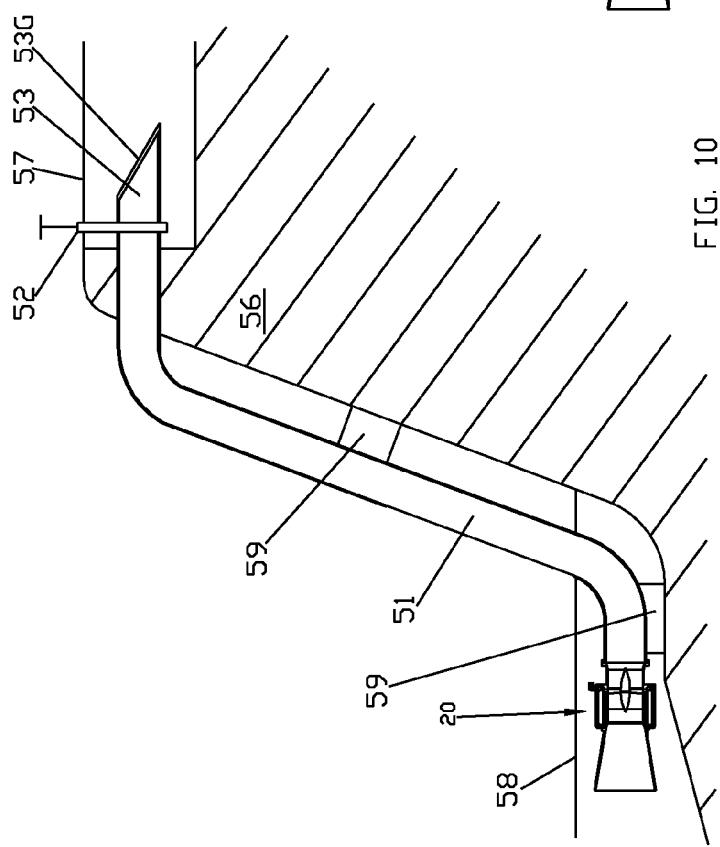

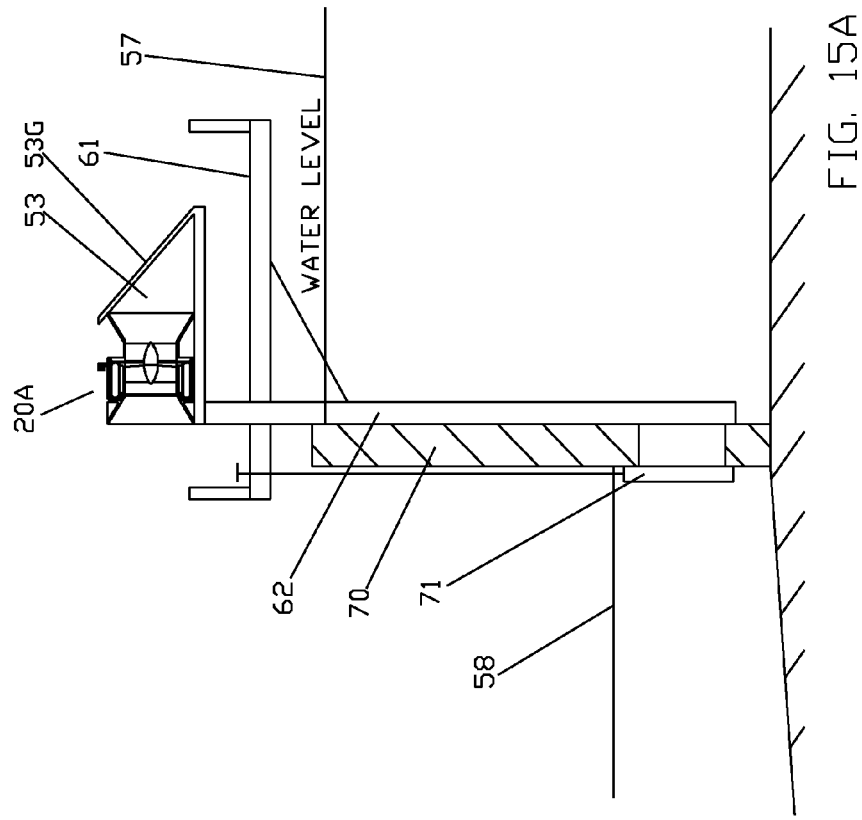
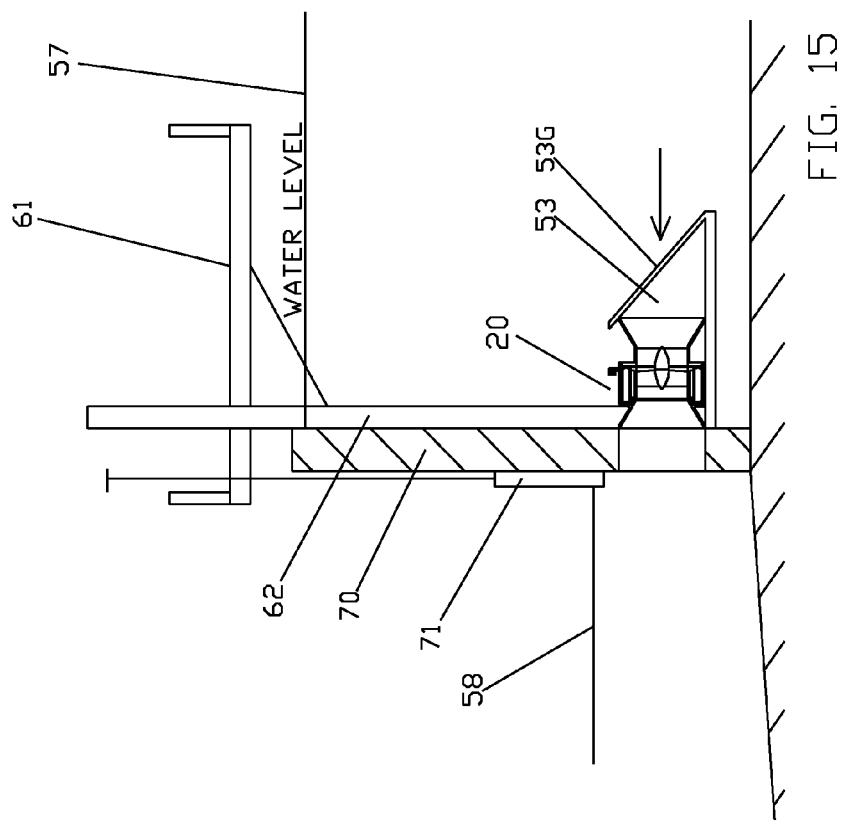

POWER CONVERSION AND ENERGY STORAGE DEVICE

RELATED APPLICATIONS

This is a continuation-in-part of U.S. patent application Ser. No. 12/691,456, filed on Jan. 21, 2010, the contents of which are herein incorporated by reference.

FIELD OF THE INVENTION

This invention relates to low-cost conversion from hydraulic power to electric power and from electric power to hydraulic power.

BACKGROUND OF THE INVENTION

Power generation from waterways is well-known and commonly practiced in coastal waters and rivers. A well-known application is in dams with built-in turbines driving generators for the production of electric power. Most navigable waterways have a controlled water level to facilitate shipping by maintaining minimum depths through the placement of dams in the waterway. Shipping is made possible through the location of locks adjacent to the dams.

The Mississippi River is an example of such a waterway with a controlled water level and a system of dams with locks. The water-level drop at most Mississippi River dams is 20 feet or less. One such dam and lock has a drop of 38 feet and has a hydroelectric power plant taking power from the waterway. The 38 feet of static head provides an opportunity to produce power efficiently since the head is substantially greater than the other dams in this waterway. The static head in most other dams is typically not sufficient to provide a satisfactory return-on-investment for a conventional hydroelectric power plant in conjunction with these dams.

The placement of dams also increases waterway draft for shipping and reduces and evens out the speed of the water flow, a benefit for the waterway shipping industry. Low-static-head systems have traditionally not attracted interest because the cost of building the conventional equipment to generate this power has been very high in relation to the benefit of the power produced. The present invention reduces the cost of the power-generating equipment to such a low level that power will now be able to be efficiently and cost-effectively produced using existing dams with low static heads.

Traditional generating systems consist of a turbine placed on a base, and the turbine is connected to a generator via a shaft and a coupling placed on that same base. The present inventive system provides for installation that is greatly simplified and reduces cost. This invention allows efficient, low-cost power generation for low-static-head applications that are not possible with conventional systems.

Cost reduction is accomplished by integrating the turbine and the electric power generator in one compact unit including non-metallic compounds to keep both cost and weight low. It is modular in design, allowing combinations of components to match with the power requirements of given applications without requiring custom designs. The inventive device fits in-line with water ducts for easy installation and maintenance. It is submersible and can be suspended under water in ways that are not possible or practical with a separate turbine and generator.

Most conventional hydroelectric power generation systems do not have the capability of reversing the operation and turning the power generation system into a pumping system by applying an electric current to the generator. The present invention allows the electric generator to become an electric motor, reversing its function by providing power to it. The axial flow turbine functions equally well as a pump so that the inventive system can be used to store energy by applying electric power to the unit and pumping water from a first reservoir to a higher-elevation second reservoir, effectively storing electrical energy by increasing the elevation of the stored water. When electronic commutation is reversed once again, it turns the power system back into a generator and so can recover the stored energy. Therefore, unlike most conventional hydroelectric power generators, the present invention can be used as an energy storage and recovery system. Because of the high efficiency of the axial flow design, both turbine and pumping functions provide the most efficient method of high-MWhr (megawatt-hour) energy storage and recovery.

The identical hardware that is the subject of this invention constitutes an electrically-powered pump for multiple industrial and marine applications such as industrial water pumps, pipeline pumps and marine propulsion systems. Conventional pumping systems consist of a separate pump and motor, requiring more complicated installation than the inventive integrated pump and motor. The integrated motor/pump configuration allows in-line installation in a pipeline for fluid transportation of all kinds, such as natural gas, oil, water and any fluid produced in industry that needs to be transferred. The high power density, non-corrosivity, and low weight of the integrated units allow in-line installation with both external dimensions and total weight five times less than the equivalent conventional pump and motor combination, all while making a pump house unnecessary.

In the prior art, a combined turbine/pump called the "Straflo" turbine (1) requires a foundation structure for support, (2) is produced entirely of metal components, (3) relies on mechanical seals to separate water from the electrical components, and (4) uses wicket gates to control flow. All four of these problematic considerations are eliminated by the present invention. The Straflo turbine does not have power-density obtained by the subject invention. Further, its cost is higher rather than lower than a conventional separate turbine and generator system.

Another prior art system is called the "Turbinator" which is an all-metal configuration that has metallic separation between water and the stator which increases weight lowers the power generation efficiency. The system also requires an oil bath with a separate cooling system to cool the stator. Therefore, its efficiency is substantially reduced and its weight is significantly higher.

OBJECTS OF THE INVENTION

It is an object of the present invention to provide a low-cost hydroelectric power-generating system which takes power from a low-head dam in a waterway that can efficiently produce electricity to economic benefit.

It is an object of this invention to replace a conventional axial flow pump with a low-cost, low-weight, in-line pumping system that can more efficiently pump fluids to economic benefit.

Another object of this invention is to produce a low-cost hydroelectric power-generating system that is quick and easy to install, service and replace.

Another object of this invention is to produce a low-cost electric power-pumping system that is quick and easy to install, service, and replace.

A further object of this invention is to combine generator and turbine functions in one housing in order to produce an in-line turbine/generator unit.

Another object of this invention is to combine motor and pump functions in one housing in order to produce an in-line motor/pump unit.

It is a further object of this invention to produce a low-cost hydroelectric power-generating system that permits applications that are conventionally not possible because of:
  physical constraints (no room to locate);
  environmental constraints (conventional system too disturbing);
  economic constraints (too costly to provide a satisfactory return-on-investment);
  configurational constraints which create no option to use the power-generating system as an energy storage device; and
  combinations of the above.

It is a further object of this invention to produce a low-cost pumping system that permits applications that are conventionally not possible because of:
  physical constraints (no room to locate);
  environmental constraints (conventional system too disturbing);
  economic constraints (too costly to provide a positive return-on-investment);
  material corrosion considerations; and
  combinations of the above.

Another object of this invention is to produce a low-cost hydroelectric power-generating system that can be reversed to store energy by pumping water to a higher level and recover the stored energy when needed by switching back to power generation.

Another object of this invention is to produce a low-cost hydroelectric power-generating system that can efficiently make use of the static head of an existing dam to produce electricity to economic benefit without disturbing the existing structure of the dam.

Another object of this invention is to provide a power conversion device which has high conversion efficiency over a wide range input static heads.

Another object of this invention is to maintain efficiency with higher static pressure heads by cascading two or more turbine/generator units in series.

Another object of this invention is to combine the generator and turbine functions in one housing so that the turbine/generator unit becomes an in-line device.

Another object of this invention is to produce a low-cost hydroelectric power-generating system that can efficiently make use of a weir without the use of a duct structure from the high-level reservoir.

Another object of this invention is to provide a power conversion system which avoids of the need to build a dam in order to capture the power-generating capability of a waterway.

Another object of the present invention is to provide the capability to use the same mechanical equipment to provide either AC or DC current by selecting appropriate power electronics.

Another object of the present invention is to provide a power conversion system which is easy to maintain and replace.

Another object of the present invention is to provide a low-cost hydroelectric power-generating system with the following features:
  power generation with a turbine/generator having only one moving part;
  low unit weight eliminating or reducing the need for a foundation;
  in-line installation;
  simple electronics packaged on the unit;
  the use of non-metallic compounds; and
  non-corrosive, submersible unit configuration.

Another object of the present invention is to provide a low-cost electric pumping system with the following features:
  pumping with a pump/motor having only one moving part;
  low unit weight eliminating or reducing the need for a foundation;
  in-line installation;
  simple electronics packaged on the unit;
  the use of non-metallic compounds; and
  non-corrosive, submersible unit configuration.

Another object of the present invention is to provide a low-cost hydroelectric power-generating system that siphons water over a dam without altering the structure of the dam and which primes the siphon with pumped water or by applying a vacuum.

Another object of the present invention is to provide a low-cost hydroelectric power-generating system that uses selectable electric poles and pole segments to provide a wide range of power levels with the same hydraulic hardware.

Another object of the present invention is to provide a low-cost integrated electric pumping system that uses selectable electric poles and pole segments to provide a wide range of power levels with the same hydraulic hardware.

Another object of the present invention is to provide a low-cost electric power-conversion system that uses a water-lubricated bearing system to support the turbine rotor.

Another object of the present invention is to provide a low-cost electric power-conversion system that uses a combination of an encapsulated stator component in combination with a water-lubricated bearing whereby the gaps between stator poles form channels to provide lubricating water access to the bearing.

Another object of the present invention is to provide a low-cost electric power-conversion system having high efficiency while delivering zero to full power.

Another object of the present invention is to provide a low-cost electric power-conversion system that eliminates external torque jolts as a result of load changes.

These and other objects of the invention will be apparent from the following descriptions and from the drawings.

SUMMARY OF THE INVENTION

The present invention is a power conversion device including: (1) a first fluid conduit; (2) a diffuser attached to the first fluid conduit and having at least one vane supporting a diffuser hub; (3) a rotor rotatably supported by the diffuser hub and having at least one rotor blade, a rotor hub, and a shroud at the periphery of the rotor, the shroud having at least one magnet mounted thereto; (4) a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil; (5) at least one commutation control device connected to the at least one electric coil and having external power leads; and (6) a second fluid conduit attached to the housing. A flow of fluid through the power conversion device causes a torque load on the rotor blades, rotating the rotor and inducing a magnetic field in the poles, generating an electric current in the at least one electric coil, converting hydraulic power to electric power.

In some embodiments of the inventive power conversion device, the diffuser and the stator may removably attached to the housing.

In some preferred embodiments of the inventive power conversion device, the stator includes at least two stator segments, each segment having at least one pole and at least one electric coil. In some such embodiments, each stator segment is removably attached to the housing, and in some of these embodiments, the stator segments are isolated from fluid by encapsulation with a non-metallic compound. Some embodiments having stator segments may include a fluid-lubricated bearing integral with the stator segments, and some of the fluid-lubricated bearing may have lubrication slots located between the poles.

Some preferred embodiments of the inventive power conversion device include a circumferential band holding the at least one magnet to the rotor.

In some preferred embodiments of the inventive power conversion device, the at least one magnet is encapsulated with a non-metallic compound.

In some preferred embodiments of the inventive power conversion device, the rotor includes rotor segments and each rotor segment has at least one rotor blade and a shroud segment. In some such embodiments, the shroud segments each have at least one magnet.

Some preferred embodiments of the inventive power conversion device include at least one cooling duct. In some of these embodiments, the cooling fluid flowing through the at least one cooling duct is at least one of the fluid flowing through the power conversion device and an alternate fluid from a separate source. In some embodiments, the at least one cooling duct is in the housing, and some embodiments have a cooling insert which includes the at least one cooling duct and surrounds the stator. In some of these embodiments, the stator and the at least one cooling insert are isolated from the fluid flowing through the power conversion device by encapsulation with a non-metallic compound. Further, in some of these embodiments, (1) the stator includes at least two stator segments, (2) each cooling insert includes at least one cooling insert segment attached to each stator segment, (3) each stator segment has at least one pole and at least one electric coil, and (4) each cooling insert segment has at least one cooling duct. And, in some such embodiments, the at least one stator segments and the at least one cooling insert segment are isolated from the fluid flowing through the power conversion device by encapsulation with a non-metallic compound.

In other preferred embodiments, the at least one commutation control device is attached to the cooling insert, and the cooling insert, the stator and the at least one commutation control device are isolated from the fluid by encapsulation with a non-metallic compound.

In some preferred embodiments, the at least one commutation control device is attached to the at least one cooling insert segment, and each stator segment and the at least one commutation control device are isolated from the fluid by encapsulation with a non-metallic compound.

Some highly-preferred embodiments of the inventive power conversion device include a fluid-lubricated bearing supporting the rotor, and in some such embodiments, the fluid-lubricated bearing is made from a non-metallic compound and has lubrication slots, and in some, the fluid-lubricated bearing is integral with the stator. Such an integral fluid-lubricated bearing may have lubrication slots located between the poles.

In highly-preferred embodiments of the inventive power conversion device, the at least one commutation control device links the electric coils directly to the external power leads, and in some highly-preferred embodiments of the inventive power conversion device, the at least one commutation control device controls the torque between the rotor and the stator by controlling the electric current through the at least one electric coil.

In some embodiments, the at least one commutation control device may be configured to control rotor rotational speed.

In some embodiments, the at least one commutation control device may be configured to substantially maximize the product of torque and rotor rotational speed as the fluid flow rate varies.

In preferred embodiments, the power conversion device includes an electric load bank and the commutation control device is configured to control the electric current to the external power leads and the load bank to keep the torque load on the rotor substantially constant as the load on the external power leads varies. In some such embodiments, the load bank is located in the at least one stator vane.

In other embodiments of the inventive power conversion device, the at least one commutation control device is cooled by at least one of the housing and the diffuser.

In highly-preferred embodiments of the inventive power conversion device, at least one of the first fluid conduit, diffuser, housing, rotor, and second fluid conduit include a skeleton over-molded with a non-metallic compound. In some highly-preferred embodiments, at least one of the first fluid conduit, diffuser, housing, rotor, and second fluid conduit include an exoskeleton formed over a core. The exoskeleton may be metallic.

Other preferred embodiments of the inventive power conversion device include a transport mechanism configured to transport the power conversion device between an operating position and a service position. In some such embodiments, the transport mechanism is configured to rotate the power conversion device about an axis perpendicular to the rotational axis of the rotor, and the power conversion device may include at least one quick-release fluid-conduit connecting clamp configured to facilitate the transfer of the power conversion device between the operating position and the service position. The transport mechanism may also be configured to transport multiple power conversion devices from operating positions to service positions.

Some preferred embodiments of the inventive power conversion device include a penstock connected to the first fluid conduit to direct fluid to the device from an upstream fluid reservoir through the power conversion device and the second fluid conduit to a downstream fluid reservoir. Some such embodiments may include an electric current source, and the current source and the at least one commutation control device may be configured to operate the power conversion device in a pump mode and a power generating mode. In such pump mode, electric current is applied to the external power leads, causing a magnetic field to drive the rotor and pump fluid up the penstock to the upstream fluid reservoir, thereby converting electrical energy to stored hydraulic energy which is later converted back to electrical energy when the power conversion device operates in power generation mode. In some embodiments, the penstock may be configured to operate as a siphon to connect the upper reservoir to the first fluid conduit. In some of these embodiments, the inventive power conversion device is configured to also operate in pump mode, and the pump mode is used to prime the siphon.

Some embodiments which include a penstock siphon may include a shut-off valve placed between the first fluid conduit and the penstock and a fluid supply valve placed in the penstock such that when the shut-off valve is closed and fluid is supplied through the fluid supply valve, the penstock fills with fluid until the siphon is primed, and when the shut-off valve opens, the power conversion device operates in power generation mode. Other embodiments which include a penstock siphon, may include a vacuum pump to prime the siphon by drawing a vacuum at substantially the highest point of the penstock.

In some preferred embodiments of the inventive power conversion device, the device is placed over an opening in a weir.

Some preferred embodiments of the inventive power conversion device include at least one auxiliary turbine in at least one of upstream and downstream positions in relation to the power conversion device. Such devices have at least one drive shaft rotatably connecting the power conversion device rotor to an at least one rotor of the at least one auxiliary turbine, whereby the at least one auxiliary turbine drives the rotor of the power conversion device.

Some preferred embodiments of the inventive power conversion device include an electric current source, and the current source and the at least one commutation control device are configured to operate the power conversion device in a pump mode and a power generating mode. In pump mode, electric current is applied to the external power leads, causing a magnetic field to drive the rotor and pump fluid from the second fluid conduit, through the housing, diffuser and first fluid conduit, thereby converting electric power to hydraulic power while operating in pump mode.

The inventive power conversion system to provide electric power to at least one external load may have a plurality of power conversion devices in fluid series and a system controller. Each power conversion device includes: (1) a first fluid conduit; (2) a diffuser attached to the first fluid conduit and having at least one vane supporting a diffuser hub; (3) a rotor rotatably supported by the diffuser hub and having at least one rotor blade, a rotor hub, and a shroud at the periphery of the rotor, the shroud having at least one magnet mounted thereto; (4) a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil; (5) at least one commutation control device connected to the at least one electric coil and having external power leads connected to at least one external load; and (6) a second fluid conduit attached to the housing. The system controller is configured to apportion the electric power to the at least one external load among the plural power conversion devices. In some such embodiments, the rotors are connected by at least one drive shaft, rotatably coupling the rotors.

Some embodiments of the inventive power conversion device comprise: (1) a first fluid conduit; (2) a diffuser attached to the first fluid conduit and having at least one vane supporting a diffuser hub; (3) a rotor rotatably supported by the diffuser hub and having at least one rotor blade, a rotor hub, and a shroud at the periphery of the rotor, the shroud having at least one magnet mounted thereto; (4) a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil; (5) at least one commutation control device connected to the at least one electric coil and having external power leads; (6) a second fluid conduit attached to the housing; and (7) an electric power source. The application of electric current from the electric power source to the external power leads causes a magnetic field to drive the rotor and pump fluid from the second fluid conduit, through the housing, diffuser and first fluid conduit, thereby converting electric power to hydraulic power.

Some embodiments of the inventive hydroelectric power-generating device comprise: (1) a fluid inlet; (2) a diffuser with (a) at least one vane supporting a diffuser hub and (b) a rotor rotatably supported by the diffuser hub and having (I) rotor blades, (ii) a rotor hub, and (iii) a shroud at the periphery of the rotor, the shroud including at least one magnet mounted thereto; (3) a housing surrounding the shroud and having a rigidly-attached stator including laminations and at least one electric coil; and (4) a source of electric current connected to the at least one electric coil. The electric current generates a magnetic field producing a torque on the at least one magnet, rotating the rotor and causing the rotor blades to pump fluid through the housing, the diffuser and the fluid inlet, thereby converting electric power to hydraulic power.

The term "current" refers to electric current produced by an electric potential differential (voltage) without which electric current cannot flow.

The term "power" refers to electric power or hydraulic power. Electric power is the product of electric current and voltage. Hydraulic power is the product of fluid flow and hydraulic pressure head.

The term "energy" refers to electrical energy or hydraulic energy. Electrical energy is the product of electric power and time. Hydraulic energy is the product of hydraulic power and time.

The term "external load" refers to the power delivered to a consumer of electric current such as the power grid or an industrial or domestic consumer.

The term "non-metallic compound" refers to any plastic or polymer that is thermoset, pressure molded or light-cured, such as neoprene, natural rubber, nitrile, epoxy, polyester or vinylester resin. The compound may be reinforced and improved in strength, heat conductivity, higher electrical resistance and lower mechanical friction by non-metallic particulate additives such as but not limited to aluminum oxide, carbon fiber, glass fiber, carbon black, Teflon, colorants and other compounds.

The term "penstock" as used herein refers to a water feed pipe that provides the connection between an upstream side of a dam, weir or reservoir and a hydroelectric power conversion device placed on the downstream side of a dam, weir, or downstream reservoir.

The term "laminates" or "laminations" refers to thin, magnetically-conductive metal sheet stampings of identical shape, that, when stacked together with electrical insulation between them, form an electromagnetic flux conduit in a plane parallel to the plane of the stampings.

The term "static head" as used herein refers to the difference in water-level elevation between upstream and downstream water levels of a dam, weir or reservoir.

The term "commutation control device" as used herein refers to an electrical switching device that links the power grid via external power leads with the electric coils of the power conversion device. The connection may be direct, whereby commutation takes place at the frequency of the power grid, or via electronic circuitry which replaces the function of conventional motor/generator brush commutation with electronic commutation with the added benefit of electric current and frequency control. When current is generated in the electric coils, the commutation control device converts the current generated to a current usable for power-grid delivery via the external power leads. In some commutation control devices, when power is supplied to the external power leads, it will convert and control the frequency and the current to the electric coils, controlling rotational speed and torque. The circuitry employs insulated-gate bipolar transistors (IGBT's). IGBT's are power electronic switching devices capable of converting AC to DC as well as DC to AC while controlling the current and frequency of the AC. An array of IGBT's forms a current inverter/rectifier and is controlled by an electronic control circuit. The IGBT's and the electronic control circuit are packaged in the commutation control device.

The term "reservoir" identifies any body of water created by a dam, weir or man-made or natural enclosure.

The term "skeleton" refers to structure made of metal or other stiff material which is then encapsulated with a non-metallic compound. The term "exoskeleton" refers to a skeleton attached to an outer surface of a core. A core consists of low-weight, low-strength, stiff material such that it maintains the shape of a final overall structure while a high-strength exoskeleton material is being applied.

BRIEF DESCRIPTION OF THE DRAWINGS

FIG. 1A (PRIOR ART) shows a conventional vertical-shaft hydroelectric turbine and generator configuration.

FIG. 2 illustrates the inventive turbine/generator in a vertical-shaft position on the same scale as the conventional turbine of FIG. 1A.

FIG. 2A illustrates the inventive motor/pump in a pipeline application.

FIG. 2B is a sectional view of the power conversion device of FIG. 2A, illustrating the device in a service position.

FIGS. 3A and 3B are elevation sections of the integrated power conversion device of FIG. 3 perpendicular to the axis of rotation, showing sections BB and CC of FIG. 3.

FIG. 5 is an elevation section in line with axis of rotation of two alternate iterations XX and YY of the preferred embodiment.

FIG. 5B is a detail C of FIG. 5.

FIGS. 6, 6A and 6B are outlines lamination shapes.

FIG. 7 is an elevation end view and partial section perpendicular to the axis of rotation.

FIG. 7A is an elevation section BB of FIG. 7, rotor deleted for clarity.

FIG. 9B is an elevation end view of a diffuser.

FIG. 9C is an elevation section AA of FIG. 9B.

FIGS. 9D and 9E are respectively a cross-section and a detailed cross-section of a diffuser having an exoskeleton over a core.

FIG. 10 is an elevation partial section of the power conversion device in an in-line static-head arrangement, using a dam.

FIG. 10A is an elevation partial section of the hydroelectric power generator in an in-line static-head arrangement, using a dam with two power conversion devices in series.

FIG. 15 is an elevation partial section of the power conversion device in a static-head arrangement, using a weir with a turbine/generator in an operating position.

FIG. 15A is an elevation partial section of the power conversion device in a static-head arrangement, using a weir with the turbine/generator in a raised position for service.

DETAILED DESCRIPTION OF PREFERRED EMBODIMENTS

The following detailed description explains a novel approach to hydroelectric power generation starting with the integration of turbine and generator. This inventive concept, with its quintuple increase in power density, permits application of hydroelectric power generation in situations previously thought impossible by drastically lowering costs of manufacture, installation and maintenance, reducing overall equipment size, and increasing system efficiency.

Likewise, the same concept can be applied with the identical hardware, without limitation, to the inverse operation of a turbine/generator, namely as a motor/pump. By providing power from an electric power source to the power conversion device, the inventive device will function as a motor and pump. The power density of the power conversion device (five times greater than the prior art) is of equal advantage as a motor/pump and has many applications for industrial, pipeline and marine use. The switching of functions from turbine to pump possible with this invention enables the storage and recovery of energy, commonly referred to as "pumped storage," the lowest cost method of storing large amounts of energy.

Figure 1:
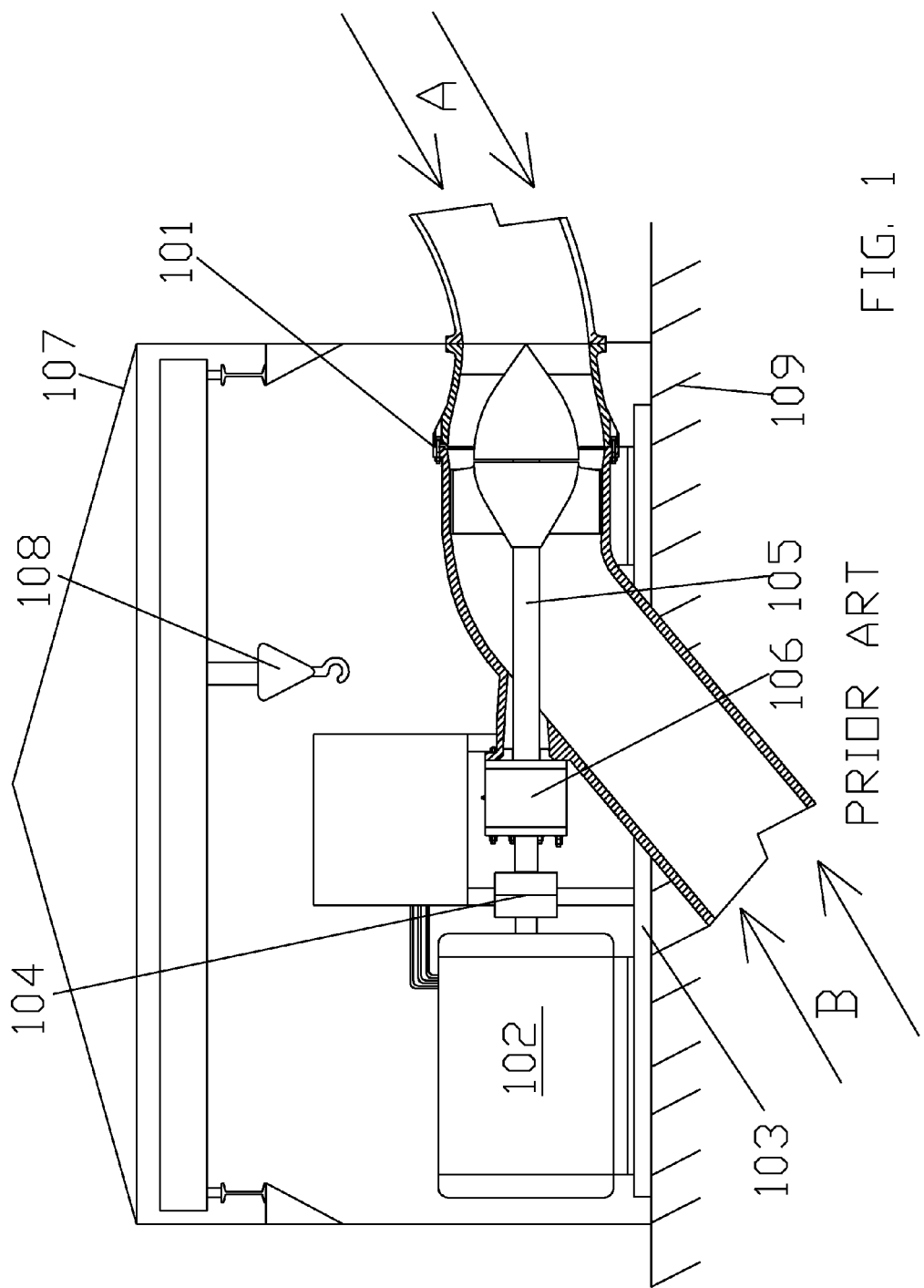
FIG. 1 (PRIOR ART) shows a conventional turbine and generator or pump and motor arrangement.

PRIOR ART TURBINES as in FIGS. 1 and 1A (PRIOR ART) illustrate the conventional way of static-head hydroelectric power generation. Water flows in direction A driving the turbine 101 and a generator 102. Turbine 101 and generator 102 are mounted on a common base 103 requiring a coupling 104, a shaft 105, and a shaft seal 106. Further, it is necessary to install and align turbine 101, shaft 105 and generator 102 on the base 103. This conventional installation requires a building 107 and an overhead crane 108. A concrete base 109 supports base 103 and building 107 in a location not convenient to maintain short supply and discharge piping runs.

FIG. 1A (PRIOR ART) shows a conventional vertical-shaft water turbine 111 and a generator 112 in which a shaft 115 connects to a transmission 116, and a coupling 114 connects transmission 116 to generator 112. Transmission 116 is placed on a base 113 and is supported by foundation 120. The adjustable pitch of a runner 121 is set by hydraulic control 122. Adjustable wicket gates 123 are adjusted by hydraulic control 124 via a control shaft 125. A concrete base structure 126 includes a flow control gate 127 and a draft tube 128. Base structure 126 further supports foundation 120, turbine 111 and building 117. Building 117 supports overhead crane 118 which is necessary to move generator 112, transmission 116, base 113, hydraulic controls 122 and 124, shafts 115 and 125, and turbine 111.

The PRIOR ART TURBINE as depicted in FIG. 1 also represents a conventional axial flow pump. Water flows in direction B through axial flow pump 101 driven by motor 102, and mounted on base 103. Components 103 through 109 perform the same functions as in the case of the turbine and generator.

The present inventive turbine/generator invention replaces the conventional prior art components shown in FIGS. 1 and 1A by combining the turbine and generator in one housing and manufacturing the components using more durable and lighter weight materials, eliminating the need for all of the components interconnecting the turbine with the generator, and replacing these components with a simple configuration having only one moving assembly (a rotor). The inventive unit can be placed in line with the water flow for low-cost, low-weight, corrosion-free, efficient power generation. The unit can be located above or under water. The configuration is capable of handling a wide range of power while keeping costs low by segmenting and modularizing the electric power-generating portions of the device. It eliminates mechanical flow controls and hydraulics (122, 123, 124 and 125 in FIG. 1A), the bane of conventional turbines, by replacing them with electronic flow control.

FIG. 2 has the same scale as FIG. 1A and shows a preferred embodiment of the inventive power conversion device 20 placed in the same concrete base structure 126 with flow control gate 127 and draft tube 128 as shown in FIG. 1A. Power conversion device 20 is placed in the same position as turbine 111 of FIG. 1A. Water enters the turbine through water valve 127 and discharges in draft tube 128. The single moving assembly of inventive power conversion device 20 is rotor 23 (see also FIG. 3). A vertical lifting track 62 in FIG. 2 enables the lifting of power conversion device 20 by a hoist 133 to a service position 20A, in this case rotated 90 degrees for service and replacement access. Device 20 is shown in FIG. 2 in both positions for illustration purposes only. A removable service deck 132 provides service access after power conversion device 20 is raised to position 20A.

The configuration of FIG. 2 eliminates the following components in the conventional systems shown in FIGS. 1 and 1A. These are: buildings 107 and 117, overhead cranes 108 and 118, generators 102 and 112, motor 102A, hydraulic flow controls 122 and 124, shaft couplings 104 and 124, water seal 106, transmission 116, bases 103 and 113, foundations 109 and 120, shafts 105, 115 and 125, adjustable wicket gates 123 and adjustable pitch runner 121. The elimination of these items represents a drastic reduction in components, in their acquisition cost as well as maintenance and amortization. Additionally, the manufacture of the components of power conversion device 20 using composite materials reduces the weight to a fraction of the same metallic components and generally obtains a five-times reduction in weight over conventional systems, permitting applications heretofore impossible because of heavy weight, large dimensions, high cost and large footprint size and often requiring a powerhouse (building). The inventive power conversion device 20 uses commutation control devices to enable constant or variable-speed operation of device 20.

FIGS. 2A and 2B illustrate a pumping-only application of power conversion device 20 in a pipeline. Power conversion device 20 in a motor/pump embodiment, provides the same basic advantages, most importantly the five-times higher power density and allowing in-line placement. The higher efficiency and non-corrosivity of power generation device 20 are equally beneficial when used as a pump-in-line compact configuration, no pump house, and lower maintenance when compared to the motor and pump of FIG. 1.

In FIGS. 2A and 2B, the supply pipe 128P feeds a fluid to power conversion unit 20 via a shut-off valve 127P in direction B. The pressurized fluid exits power conversion device 20 via another valve 127P (because such valves are identical) into a discharge pipe 126P. Power conversion device 20 has only one moving part, i.e., rotor 23. Device 20 may be removed for service or replacement in less than one day via a track 131 and a carriage 133A. Track 131A allows the movement of power conversion device 20 out of the pipeline (128P and 126P) for service and replacement after closing valves 127P to isolate power conversion device 20 from the line.

FIG. 2B is a sectional view AA that illustrates power conversion device 20 in service position 20A. Pipes 128P, 126P and valves 127P are supported by valve and pipe supports 132P. Power conversion device 20 uses commutation control devices 44 to operate at a constant speed or to operate as a variable speed motor/pump.

Figure 3:
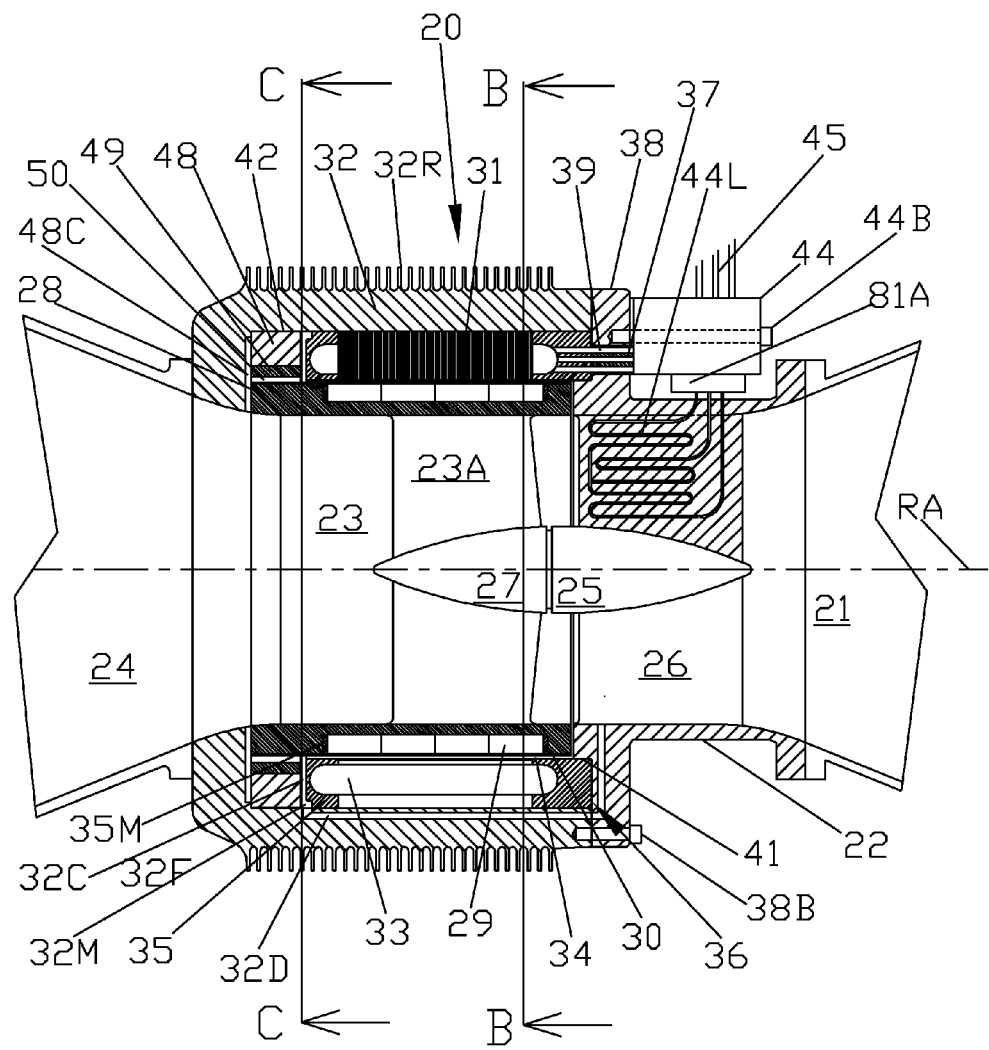
FIG. 3 is an elevation section of the integrated power conversion device in line with the axis of rotation.

FIG. 3 shows power conversion device 20 in its basic preferred embodiment in elevation section AA. FIG. 3A shows device 20 in an elevation section perpendicular to its axis of rotation RA, section lines BB of FIG. 3. FIG. 3B shows a water-lubricated bearing 48 as part section CC of FIG. 3. Power conversion device 20 includes of a first fluid conduit 21, connected to a diffuser 22 supporting rotor 23 rotatably supported by a hub 25 of diffuser 22. Hub 25 is fixed to diffuser 22 by stator vanes 26. Rotor 23 has rotor blades 23A, a rotor hub 27 and a shroud 28 around the periphery of rotor 23. Shroud 28 has attached magnets 29 and a circumferential band 30 to retain magnets 29 on the rotor 23. Magnets 29 are encapsulated with a non-metallic compound 35M to prevent water access to magnets 29. Compound 35M may be a material such as but not limited to neoprene, nitrile rubber, an epoxy compound, or the like.

A housing 32 surrounds rotor 23 which includes a stator 36 and a water-lubricated bearing 48. Stator 36 is removable and held in place by a diffuser flange 38 which is held to housing 32 with fasteners 38B. Stator 36, bearing 48, housing 32 and diffuser 22 are held in alignment by registers 41 and 42. Stator 36 consists of a stack of laminations 31 which form a set of poles 31P having electrical coils 33 wound therearound. Stator 36 is encapsulated with a non-metallic compound 35 (such as similar to compound 35M) to prevent water access to laminations 31 and coils 33. Non-metallic compound 35 and band 30 maintain a gap 34 between rotor 23 and stator 36 to avoid mechanical interference between rotating band 30 and non-rotating non-metallic compound 35 on the inner surface of stator 36. Housing 32 is connected to a second fluid conduit 24.

Rotor 23 suspended in hub 25 represents an overhung mechanical load on hub 25. In order to stabilize rotor 23 as a result of transient imbalances and resonance speeds and to prevent mechanical interference in gap 34, water-lubricated bearing 48 is advantageously placed at the opposite end of diffuser 22, away from bearing hub 25. Water-lubricated bearing 48 is placed around band 30 and has a non-metallic compound inner surface 49 and slots 50 to provide water access to bearing 48.

Internal power leads 39 connect electric coils 33 with commutation control devices 44, passing through a gland 37 sealing leads 39. External power leads 45 connect commutation control devices 44 to a power grid (external load; not shown). Commutation control devices 44 convert the electric current through leads 39 to an electric current that is adapted to the power grid connected by external power leads 45. In FIG. 3, three individual leads 45 are shown to accommodate delivery of three-phase AC power to the power grid. Commutation control devices 44 may alternatively be configured to deliver DC power to an external load using two of leads 45. More than one communication control device 44 may be used and multiple set of leads 45 may be connected in parallel to deliver the total capacity of power conversion device 20.

Commutation control devices 44 need to be cooled since electronic switching gear such as insulated-gate bipolar transistors (IGBT's) and other electronic circuitry generate heat as a result of the electric current flowing therethrough. Therefore commutation control devices 44 are attached to housing 32 or diffuser flange 38 with one or more fasteners 44B to provide cooling for devices 44. Additional cooling requirements result from the internal resistance of coils 33 and the magnetic flux changes in laminations 31 and magnets 29. Cooling of magnets 29 in rotor 23 occurs by water flow through gap 34. Band 30 is made of metal and provides suitable thermal conductivity. Housing 32 includes cooling fins 32R to cool housing 32. Alternatively, one or more ducts 32D, running through flange 38 and housing 32, a cooling manifold 32M, and a water passage 32C provide the cooling for stator 36, using a portion of the water flowing through device 20. (Whether device 20 is used in power-generation mode or pump mode, the hydraulic pressure in diffuser 22 is always higher than the pressure in fluid conduit 24.) In addition, these passages provide flow for the lubrication of bearing 48 via slots 50 and a channel 48C.

When power conversion device 20 operates as a turbine/generator, first fluid conduit 21 feeds water into diffuser 22 past stator vanes 26 and through rotor 23, passing rotor blades 23A and exiting through second fluid conduit 24. The water flow past rotor blades 23A causes rotor 23 to rotate, thereby causing magnets 29 to create a magnetic flux in laminations 31, inducing an alternating current in electric coils 33. Internal leads 39 conduct the electric current from electric coils 33 to commutation control devices 44 that switch or convert the electric current as described above.

Figure 4:
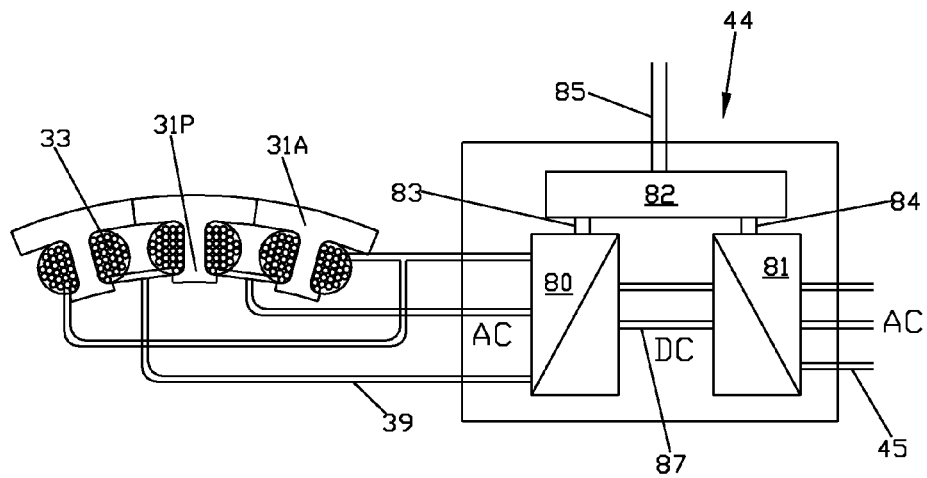
FIG. 4 is a schematic block diagram of the electronic and power electronic components.

Commutation control devices 44 may consist of mechanical or electronic interconnect devices connecting leads 45 with internal leads 39, the commutation frequency being equal to the frequency on leads 45, and consequently rotor 23 operates at a constant speed. An alternate form of control is shown in FIG. 4 in which the alternating electric current generated in coils 33 as a result of the rotation of rotor 23 may have a varying frequency which is dependent on rotor 23 rotational speed. Such power is then transported via leads 39 to commutation control device 44 containing a rectifier/inverter 80 and converted to DC and in turn transported via leads 87 to a rectifier/inverter 81. At this point, the power is converted to a usable alternating current to be distributed via external leads 45 to an external load. The rectifier/inverters 80 and 81 are controlled by an electronic circuit 82 via leads 83 and 84 which have input signals 85 by which to set frequency and current. Alternately, electronic control circuit 82 may be programmed to automatically control frequency and current. These functions allow the water flow rate through device 20 an its power output to be controlled without the need for mechanical flow controls (eliminating from FIG. 1A pitch control 122, adjustable pitch rotor blade 111, wicket gate control 124 and wicket gates 123).

Figure 4A:
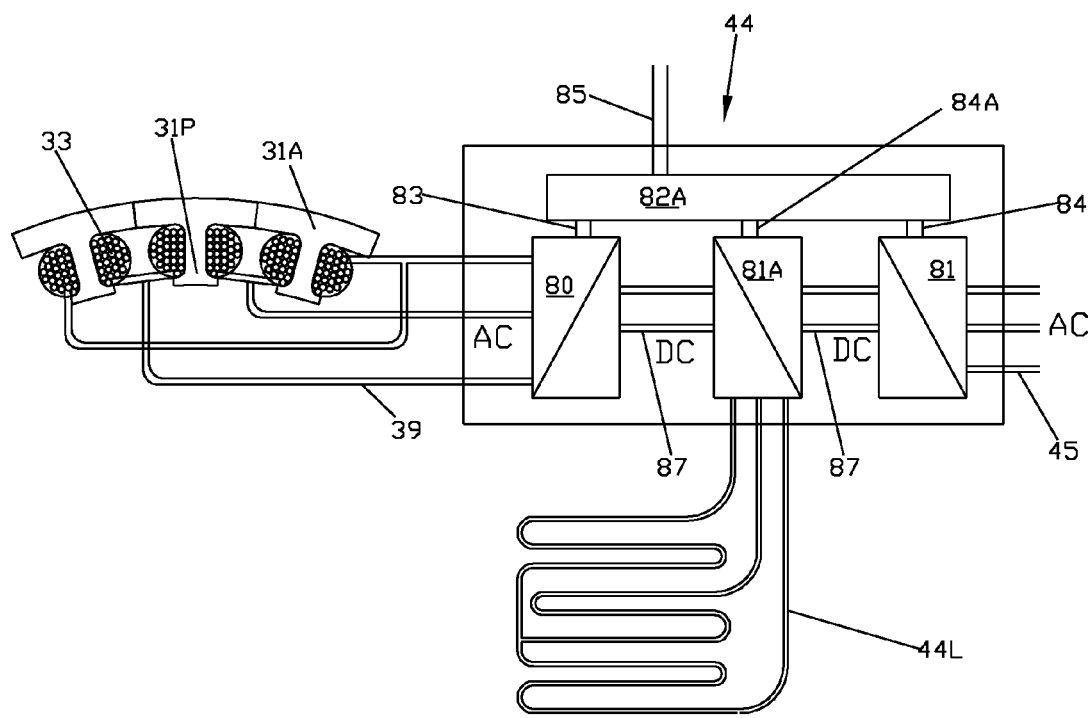
FIG. 4A is a schematic block diagram as in FIG. 4 with added load bank.

In some applications, with device 20 in portable form, when an electrical load is placed instantly on device 20, a torque jolt may be experienced on stator 36 and housing 32. As shown in FIG. 4A, a load bank 44L is used to prevent a torque jolt on stator 36 and housing 32 by absorbing and releasing the generated electrical power when a such load is connected or disconnected respectively. Load bank 44L may be placed in stator vanes 26 to avoid placing load bank 44L externally. FIG. 4A shows in block diagram form load bank 44L controlled by electronic circuit 82A via leads 84A which controls rectifier/inverter 81A and in turn the current to load bank 44L. Control circuit 82A provides the control signal on leads 84A for rectifier/inverter 81A, and load bank 44L maintains a constant load on leads 39 regardless of the load level on leads 45, thus eliminating torque jolts on stator 36 and housing 32. Rectifier/inverters 81A and 81 together deliver power to either an external load on leads 45 or load bank 44L to maintain a constant torque load on device 20. One or more commutation control devices 44 may be used within a single device 20, and multiple sets of external power leads 45 may be connected in parallel, summing the output to the external load.

Referring to FIGS. 3 and 4, when power conversion device 20 operates as a motor/pump, with electric power applied to leads 45, commutation control devices 44 receive current via leads 45 and deliver electrical AC power to leads 39. Such power flowing through coils 33 creates a magnetic field in laminations 31 and poles 31P, exerting torque on magnets 29 on rotor shroud 28, thus rotating rotor 23. Rotor blades 23A drive the water through second conduit 24 to diffuser 22 and past stator blades 26 to first fluid conduit 21. Commutation control devices 44 may consist of mechanical or electronic interconnect devices, connecting external leads 45 directly to leads 39. In such a case, the commutation frequency is equal to the frequency of the power source and consequently, rotor 23 is driven at a constant speed. Using an alternate form of control as shown in FIG. 4 to drive device 20 at variable speeds, alternating electric current from an electric power source is applied to external power leads 45 and commutation control device 44. Rectifier/inverter 81 converts the electrical current to DC. Via leads 87, the direct current is delivered to rectifier/inverter 80 that converts the DC to AC of variable frequency. This electrical power then energizes to electric coils 33 via leads 39, rotating rotor 23 at a speed corresponding to the frequency produced by rectifier/inverter 80.

In pump mode, rectifier/inverters 80 and 81 are controlled by electronic circuit 82 via leads 83 and 84 having input signals 85 to set frequency and current. Alternately, electronic control circuit 82 may be programmed to automatically control frequency and current. One or more commutation control devices 44 within device 20 may be connected in parallel to the power source via leads 45 to drive device 20 as a pump at variable speed.

Start-up of power conversion device 20 as a turbine/generator requires establishing a water flow from first fluid conduit 21 to second fluid conduit 24, thereby rotating rotor 23. External leads 45 are connected to an external load. Starting power conversion device 20 as a motor/pump requires connecting leads 45 to a power source while rotor 23 not rotating. The capability of power conversion device 20 to reverse function without altering device 20 in any way allows device 20 to function as an energy storage device by pumping water to a higher elevation level in a reservoir and reclaiming the stored power later by running device 20 as a turbine/generator.

Figure 5A:
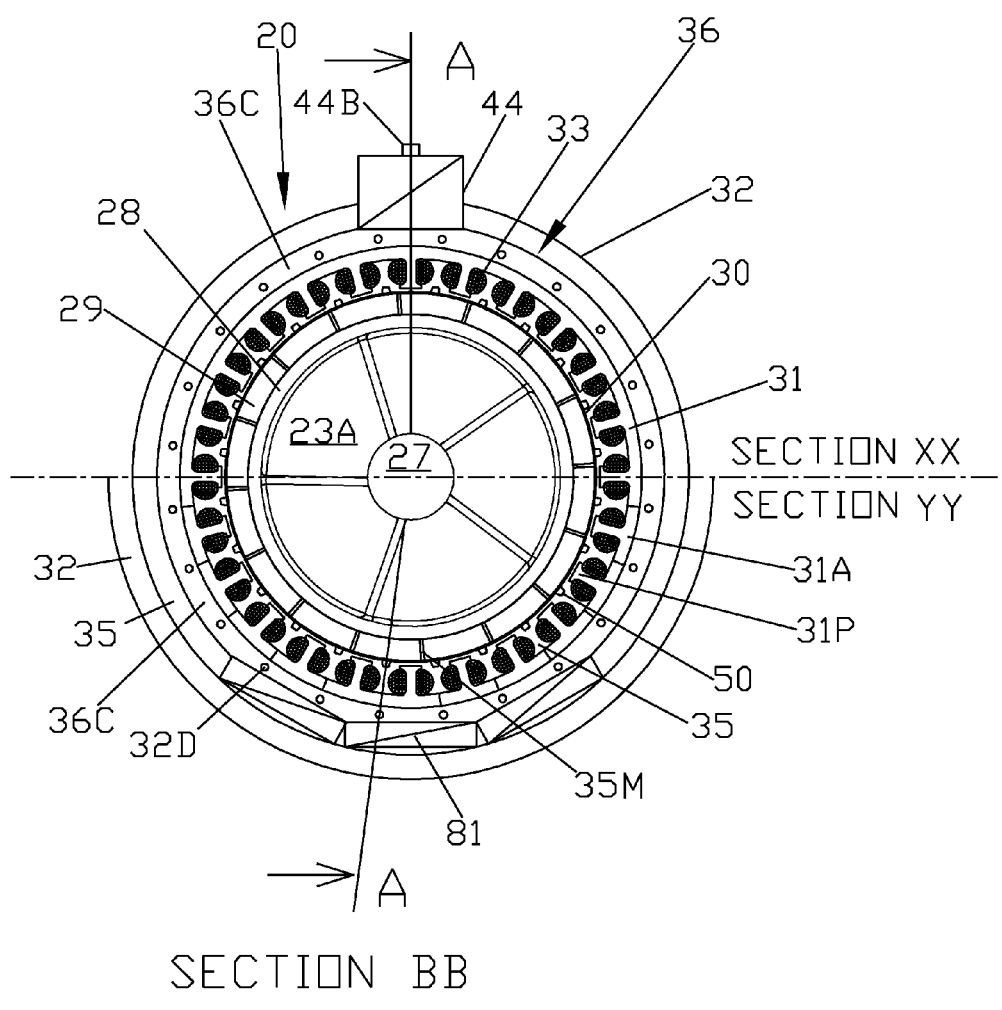
FIG. 5A is an elevation section perpendicular to the axis of rotation, showing section BB of FIG. 5 in both XX and YY iterations.
Figure 8A:
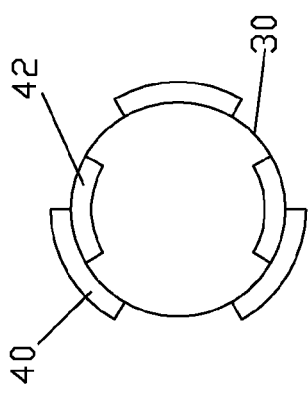
FIGS. 8A, 8B, 8C and 8D are block representations of combinations of stator and rotor in reduced-power arrangements.
Figure 8B:
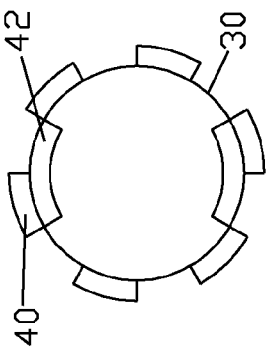
Figure 8C:
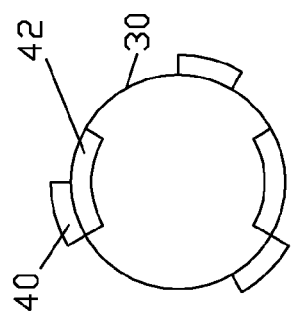
Figure 8D:
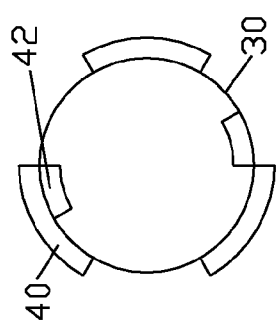

FIGS. 5 and 5A show the cross-sections of two embodiments of power conversion device 20, identified as cross-sections XX and YY. The XX embodiment illustrates laminations 31 using a full complement of electric coils 33 (see also FIG. 6). The YY embodiment illustrates a lamination configuration in which the laminations are segmented into segments 31A (see also FIG. 6A). FIGS. 6, 6A and 6B (larger multi-pole segments) show lamination configurations that, when stacked, produce the flux conduit for a circular or segmented stator 36.

Since the construction of housing 32 may be of composite materials with poor heat conductivity and since stator 36 also may require cooling, a high-thermal-conductivity cooling insert 36C may be placed around stator 36 to effect adequate cooling. FIGS. 5 and 5A illustrate cooling insert 36C on the X-side (upper) and the Y-side (lower) of device 20. Ducts 32D provide the water flow through diffuser flange 38, insert 36C, and housing 32. The pressure differential between the high pressure side of rotor 23 (in diffuser 22) and the low pressure side (in second fluid conduit 24) ensures water flow through ducts 32D.

Both embodiments XX and YY as presented in FIGS. 5 and 5A employ stator 36 encapsulation 35 as described above. A simplification of encapsulation 35 integrates water-lubricated bearing 48 which stabilizes rotor 23 with stator 36, thus eliminating the need for a separate bearing 48. The configuration of FIGS. 5 and 5A illustrates lubrication slots 50 placed between poles 31P to take advantage of the depth of non-metallic compound 35 between poles 31P while not affecting the thin layer of compound 35 surrounding poles 31P that also forms the bearing surface of integrated bearing 48.

Referring again to FIGS. 5 and 5A, commutation control devices 44 need to be cooled for the same reasons as described above. Commutation control device 44 can be fastened directly to cooling insert 36C with one or more fasteners 44B as shown in FIGS. 5 and 5A, section XX. To produce a more compact configuration, the components (rectifier/inverters 80, 81 and control circuit 82) of commutation control device 44 are advantageously attached directly to cooling insert 36C (see also FIG. 5B). These components (80, 81, 82) of commutation control device 44, are directly installed on cooling insert 36C to ensure cooling. All of the components (36, 36C, 80, 81 and 82) are encapsulated with non-metallic compound 35 in housing 32.

In case the water flowing through power conversion device 20 is contaminated or otherwise unsuitable, cooling passages 32D may become blocked. In such circumstances, the cooling of stator 36 is accomplished by using a separate cooling medium passing through cooling ducts 32D. (A separate cooling medium reservoir and pump are not shown but are connected via sockets 32F as shown in FIG. 5B.)

A quick-disconnect arrangement is employed to reduce the time required to move power conversion device 20 from an operating position to a service position 20A and to enable servicing and replacement of components or the complete device 20 in a short period of time. FIG. 5 shows a quick disconnect coupling QDC between diffuser 22 and first fluid conduit 21. Coupling flanges 22F and 21F are held together by a clamp 21C. Quick-disconnect coupling QDC is sealed with an O-ring 21S. Clamp 21C is removable by releasing one or more fasteners (not shown) in a manner well known to those skilled in the art of hydraulic technology. A well-known brand name is "Victaulic," and other similar devices may be employed.

FIGS. 7 and 7A illustrate that for larger installations, stator 36 and laminations 31 fabricated in circular forms are expensive and unwieldy. In these figures, stator 36 includes a plurality of stator segments 40, laminations 31 include a plurality of lamination segments 31B. (As shown in FIG. 5B, section YY, an assembly of lamination segments 31A is used to create a 360 degree circular stator 36.) Segments 31B, each containing more than one pole 31P, are employed to produce the 360 degree circular stator 36.

Figure 7B:
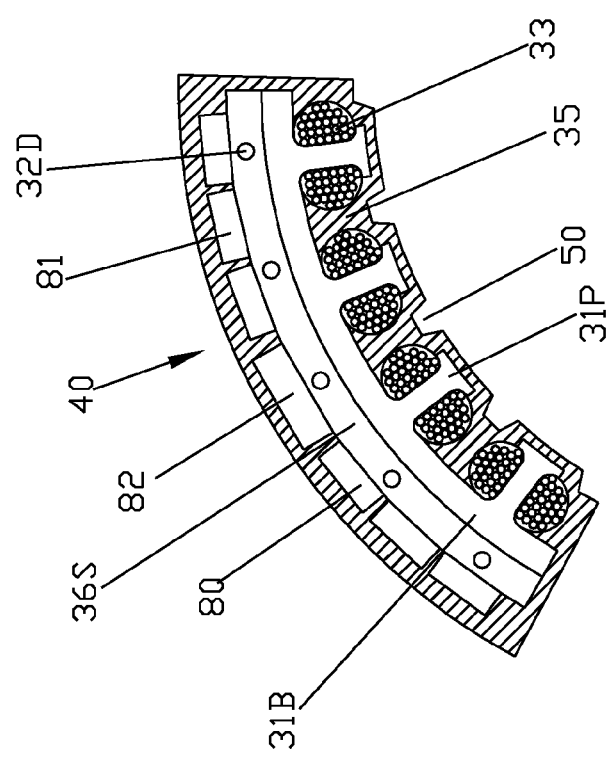
FIG. 7B is a detail section of FIG. 7 partial section.

Taking this segmentation approach one step further, lamination segments 31B are provided with electrical coils 33, and a segment 31B and its related poles 31P and coils 33 are separately encapsulated with non-metallic compound 35, forming stator segments 40 that in turn, when placed in an array, form a 360 degree circular stator 36. Stator segments 40 are placed in housing 32 and be held in place by diffuser flange 38. Cooling insert 36C is also segmented into cooling insert segments 36S to match stator segments 40 which are attached to lamination segments 31B. The components of commutation control device 44, namely rectifiers/inverters 80 and 81 and electronic control circuit 82, are attached to cooling insert segment 36S and encapsulated with non-metallic compound 35 to produce a self-contained stator segment 40 as shown in FIG. 7B.

Some applications of inventive power conversion device 20 may operate at power levels significantly lower than the maximum possible power for a specific diameter of power conversion device 20. An efficient way to accomplish lowering the output is to limit the number of electric coils 33 and the span and number of lamination segments 40 placed in housing 32. This is accomplished by alternating stator segments 40 with blank stator segments 41 as shown in FIGS. 7 and 7A. Stator segments 41 are tapered to wedge segments 40 in place with fasteners 47. The modular installation of stator segments 40 and blank stator segments 41 enable the same basic power conversion device 20 to be adaptable to many power configurations using the same basic hardware.

Still referring to FIG. 7, rotor magnets 29 are placed at intervals around rotor 23 to decrease the torque load on rotor 23 and consequently lower the power generated. It is important to maintain a constant torque load throughout a single revolution to keep rotational speed of rotor 23 constant. As shown in FIG. 7, rotor 23 is made in rotor segments 42 and 43, each rotor segment 42, 43 includes at least one blade 23A and shroud segment 28S. Each rotor segment 42 includes at least one permanent magnet 29 while each rotor segment 43 does not include a magnet 29. A complement of rotor segments 42 and 43 together form a complete 360 degree rotor 23. Band 30 holds rotor segments 42 and 43 in place. FIGS. 8A-8D show in schematic form four combinations of stator segments 40 and rotor segments 42 which are used to achieve different design power levels. (Blank stator segments 41 and non-magnet rotor segments 43 are not shown or labeled for simplicity.) Such segmented configurations allow a wide variety of ways to distribute the torque over a single revolution and can produce varying output levels as desired.

FIGS. 9, 9A, 9B and 9C illustrate one way to construct diffuser 22. All components such as housing 32, diffuser 22, rotor 23, and first and second conduits 21 and 24 may be manufactured using this process. The construction of diffuser 22 is described since it is the most complex of such components.

Figure 9A:
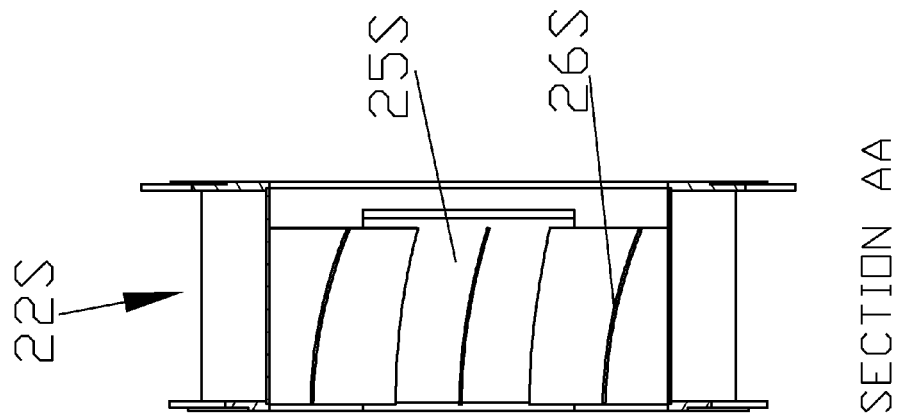
FIG. 9A is an elevation section AA of FIG. 9
Figure 9:
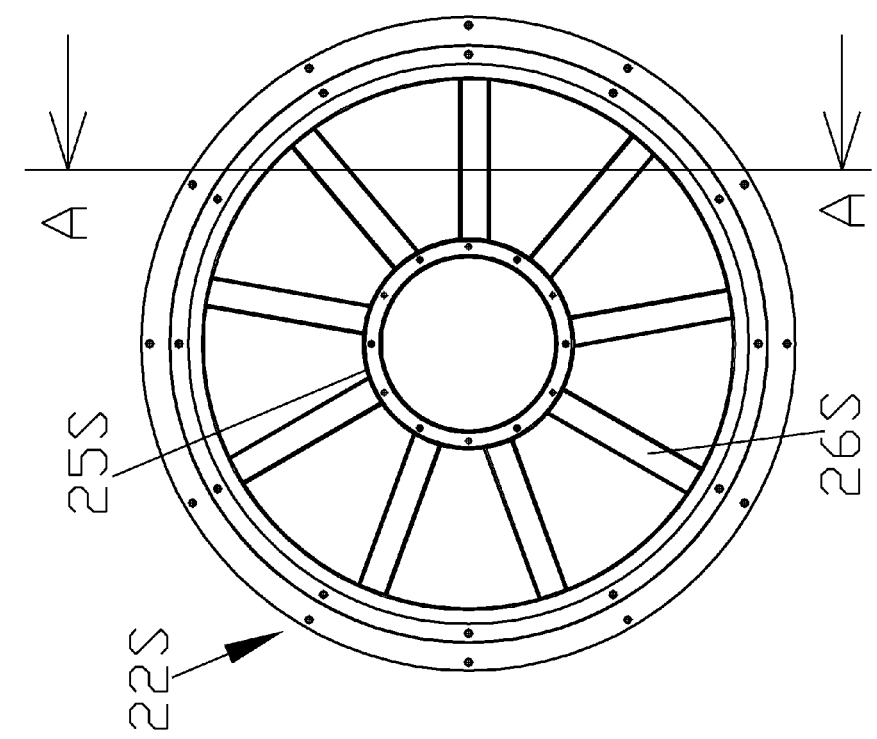
FIG. 9 is an elevation end view of a diffuser skeleton.

Power conversion device 20 includes main components of device 20 which are made in part of non-metallic compounds, reducing cost, weight and corrosion. The modulus of elasticity of non-metallic compounds is significantly lower than that of metal. It is necessary to make certain that any deflection under load is restrained or compensated for in a way that will not affect axial alignment of stator 36 and rotor 23. To maintain dimensional accuracy under load, rotor 23, housing 32, diffuser 22, and first and second conduits 21 and 24 are composite structures each consisting of a stiff skeleton encapsulated with non-metallic compound 35R to achieve the hydrodynamic shape required and the non-corrosivity, erosion resistance and low weight desired. FIG. 9 shows in elevation a diffuser skeleton 22S made of welded metal. Section AA in FIG. 9 is also shown in FIG. 9A, illustrating a hub skeleton 25S and stator vane skeletons 26S. FIG. 9B shows the completed and encapsulated diffuser 22, and the section AA in FIG. 9C shows both diffuser skeleton 22S and the non-metallic compound 35R. Non-metallic compound 35R may be but is not limited to nitrile rubber, neoprene, or another suitable polymer compound.

Referring to FIGS. 9D and 9E, another method of manufacturing a lightweight component (e.g., diffuser 22) with great stiffness is to produce a core 22C having the same shape as the final component (diffuser 22) but which is smaller by, say 0.050 of an inch, over the entire surface of the component. Core 22C is made of a lightweight, stiff plastic or other suitable material to maintain shape while a strong material layer 22L is deposited on core 22C. Layer 22L is made of a metallic or non-metallic material with a thickness of, say, 0.050 inches to arrive at the full size of the component (diffuser 22). Layer 22L is referred to as an exoskeleton.

The advantages of nitrile rubber compounded with Teflon and thermal-conductivity-improving materials such as aluminum oxide, when used as non-metallic compounds 35, 35M, and 35R are many, including: (1) non-corrosivity and capable of handling many corrosive fluids; (2) a surface durometer value to reduce erosion and permitting use as a fluid-lubricated bearing surface; (3) resistance to organic growth and low surface friction; (4) good thermal-conduction properties to ensure heat transfer from coils, laminations and magnets; (5) dielectric properties to electrically isolate the electric coils; (6) sealing properties with excellent adhesion; and (7) a 75% reduction in component weight compared to an all-metal component of the same dimensions. Such material properties can be tailored to usage as compound 35, 35M and 35R appropriately since the requirements of these materials may be different depending on the function of a particular component of device 20 to be fabricated.

FIGS. 10-15 illustrate various applications of power conversion device 20. Axial flow water turbines are generally capable of handling static heads from a few feet to up to 60 feet efficiently. FIG. 10 shows a basic installation of power conversion device 20 on a dam 56. Dam 56 retains water in an upstream reservoir at a level 57. The static head created by dam 56 is the height differential between upstream level 57 and a downstream level 58. A penstock 51 feeds water to device 20 via intake 53 which has a set of grid bars 53G and a shut-off valve 52. Penstock 51 is supported by several pipe supports 59. Shut-off valve 52 serves to shut off the operation of power conversion device 20 to allow device 20 to change operation from power-generation mode to pump mode and back.

Figure 11:
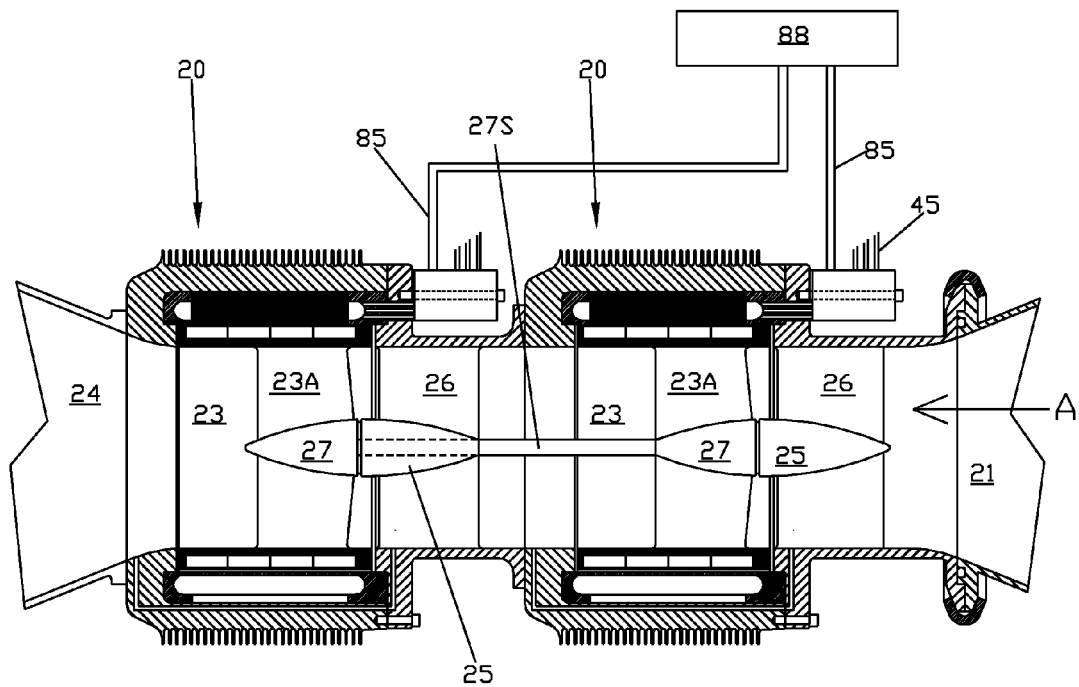
FIG. 11 is an elevation partial section of two power conversion devices in series

FIGS. 10A and 11 show the placement of two power conversion devices 20 in series to deal with higher static heads. Two power conversion devices 20 are placed in-line and connected to penstock 51. The conventional method to handle the higher static head is to use a single, different-style turbine that is significantly more expensive to manufacture and far exceeds the cost of two of the present inventive devices 20. Multiple integrated power conversion devices 20 can be cascaded in this manner to cover a wider range of static head pressures. Power conversion devices 20, arranged in series, may have at least one drive shaft 27S rotatively connecting rotors 23 to ensure that rotors 23 all turn at the same speed. A system controller 88 serves to apportion the power output of each device 20 via control signal leads 85.

Figure 12:
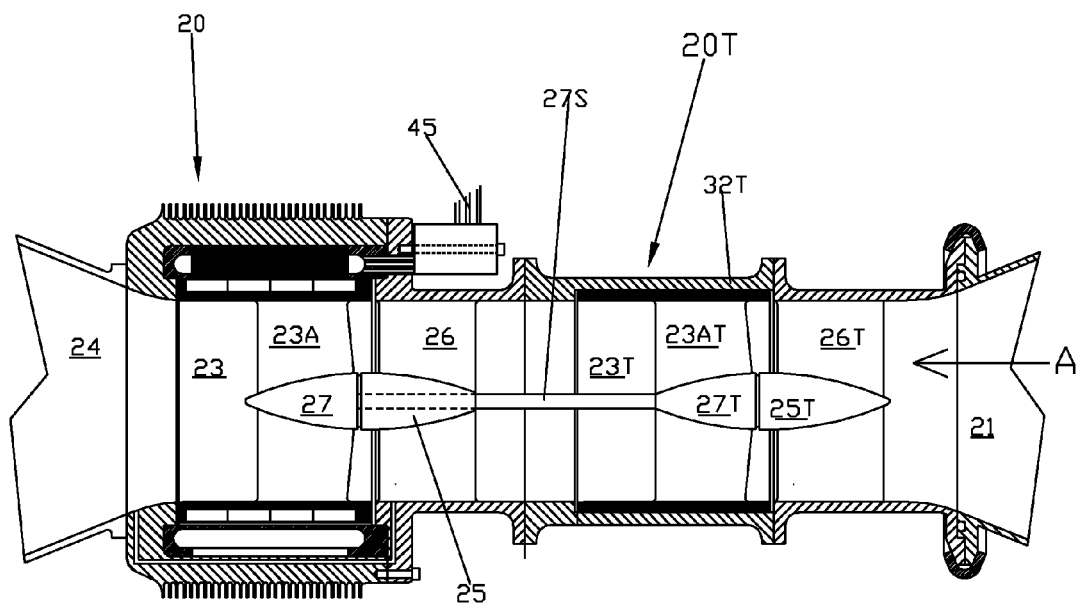
FIG. 12 is an elevation partial section of a power conversion device in series with an auxiliary turbine.

FIG. 12 illustrates a master-slave arrangement of power conversion device 20 which includes an auxiliary turbine 20T (slave) to divide head pressure over multiple units in front of or behind the master portion of power conversion device 20. (In FIG. 12, water flow direction A indicates that auxiliary turbine 20T is in front of the master portion of device 20.) At least one auxiliary turbine 20T having a diffuser 26T, with a hub 25T supporting a rotor 23T via rotor blades 23AT and rotor hub 27T is placed in line with power conversion device 20 and rotor 23 is rotatively connected with a drive shaft 27S to at least one rotor 23T of at least one auxiliary turbine 20T.

Figure 13:
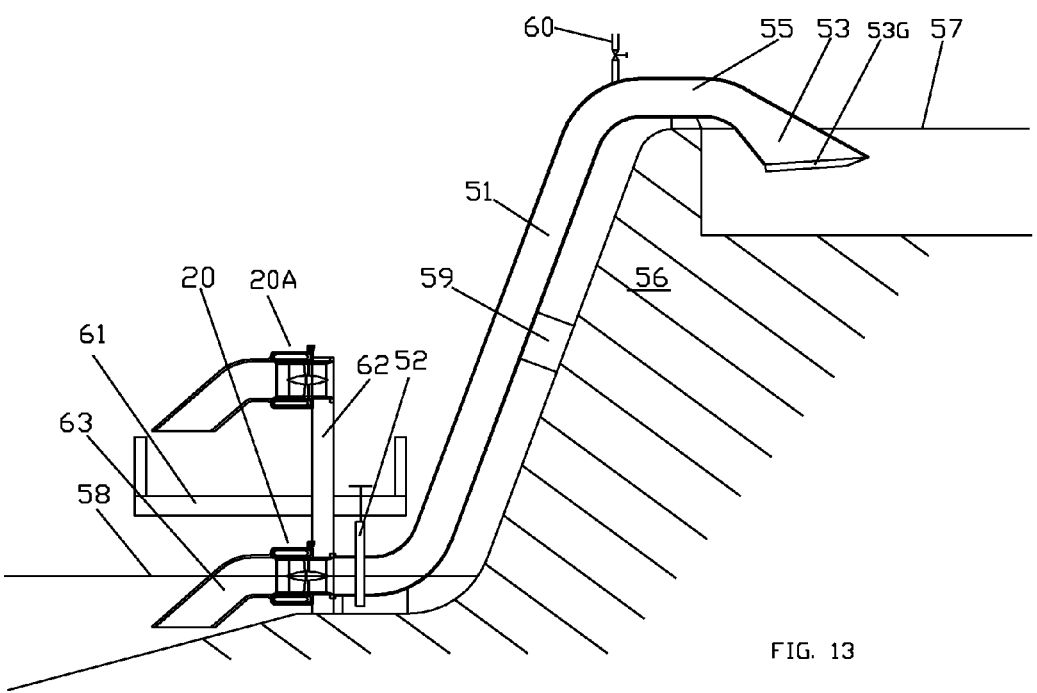
FIG. 13 is an elevation partial section of the power conversion device on a dam with siphon and service track.

FIG. 13 illustrates a method of generating power from existing dam 56 without the need to modify dam 56. Penstock 51 includes a siphon 55 placed over dam 56 with one end connected to penstock 51 and the other end submerged below upstream water level 57 below the waterline. The upstream end of siphon 55 is provided with intake 53 and grid bars 53G to prevent debris from entering siphon 55. Shut-off valve 52 is placed in penstock 51 adjacent to device 20, and a valve 60 is placed on top of siphon 55 but over penstock 51 to ensure that water from valve 60 flows into penstock 51. To prime siphon 55, shut-off valve 52 is closed and valve 60 is opened, filling penstock 51 with water. After penstock 51 is filled, valve 60 is closed and shut-off valve 52 is opened to start the water flow through device 20.

FIG. 13 also illustrates a second method of priming siphon 55. Since the hydrodynamic and electrical functions of power conversion device 20 are fully reversible, applying power to device 20 will turn it into an axial flow pump. An axial flow pump needs to be submerged at least up to the shaft centerline to prime itself. Further, to prevent device 20 in pump mode from aspirating air, a draft tube 63 is placed on device 20. When device 20 is energized, it will pump water up penstock 51 and through siphon 55. As soon as water exits through intake 53, the function of device 20 is changed back to power generation mode by closing and re-opening shut-off valve 52 to establish water flow through siphon 55 and power conversion device 20.

A third method to prime siphon 55 is also illustrated in FIG. 13. Vacuum is applied to siphon 55 through valve 60 (vacuum pump not shown) at the high point of siphon 55, removing air from siphon 55 in order to draw water into siphon 55, filling penstock 51 with water. Siphon 55 start-up proceeds as previously described. As before, shut-off valve 52 serves to stop power conversion device 20 and permit reversal of operation between turbine and pump functions.

Since device 20 is below downstream water level 58, servicing device 20 in this position can be difficult. FIG. 13 also shows the installation of a catwalk 61 and vertical slide track 62 which enables device 20 to be raised for access for inspection and maintenance or replacement. Power conversion device 20 is shown in service position 20A. Device 20 is shown in FIG. 13 in both positions for illustration purposes only.

Figure 14:
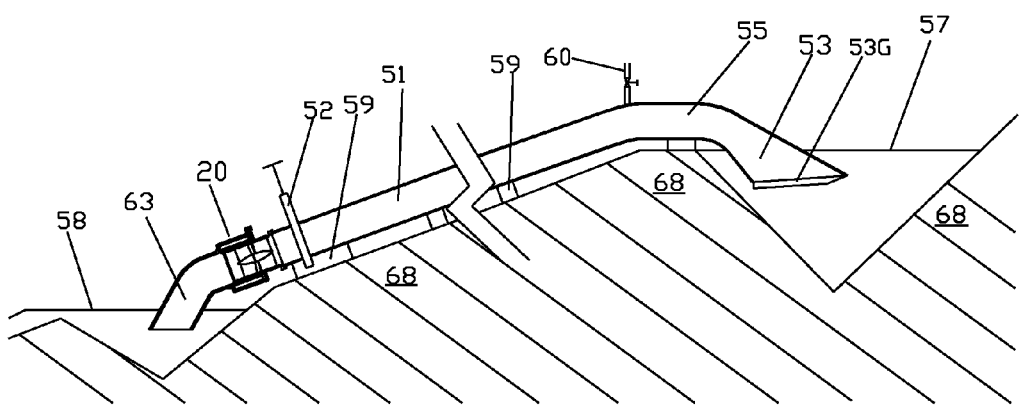
FIG. 14 is an elevation partial section of a non-dam installation using a siphon.

FIG. 14 illustrates inventive power conversion device 20 in a non-dam application using the natural slope and features (i.e., local pools) of a suitable river bed. Intake grid bars 53 at the intake 53 end of penstock 51 block debris from entering device 20. Penstock 51 is mounted on suitably-positioned supports 59. The static head of the river bed site spans between upstream level 57 and downstream level 58, causing water flow through device 20 after priming the siphon 55 in the water-fill and vacuum methods as described before.

FIG. 15 shows the placement of power conversion device 20 at the bottom of a weir 70. A slide valve 71 is shown in an open position and can be closed to stop the water flow through device 20. Device 20 can be raised along vertical slide track 62 to service position 20A. FIG. 15A shows slide valve 71 in a closed position and device 20 out of the water in service position 20A. Catwalk 61 provides access for inspection, maintenance and replacement.

While the principles of this invention have been described in connection with specific embodiments, it should be understood clearly that these descriptions are made only by way of example and are not intended to limit the scope of the invention. Specifically, water is used in the above description, but it is to be understood that any fluid may be used, particularly in pumping applications.

The invention claimed is:

1. A power conversion device comprising:
   a first fluid conduit;
   a diffuser attached to the first fluid conduit and having at least one vane supporting a hub of the diffuser;
   a rotor rotatably supported by the hub of the diffuser and having at least one rotor blade, a rotor hub, and a shroud at the periphery of the rotor, the shroud having at least one magnet mounted thereto;
   a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil;
   a fluid-lubricated bearing integral with the stator and supporting the rotor and having lubrication slots located between the poles;
   at least one commutation control device connected to the at least one electric coil and having external power leads; and
   a second fluid conduit attached to the housing,
   whereby a flow of fluid through the power conversion device causes a torque load on the rotor blades, rotating the rotor and inducing a magnetic field in the poles, generating an electric current in the at least one electric coil, converting hydraulic power to electric power.

2. The power conversion device of claim 1 wherein the diffuser is removably attached to the housing.

3. The power conversion device of claim 1 wherein the stator is removably attached to the housing.

4. The power conversion device of claim 1 wherein the stator includes at least two stator segments, each segment having at least one pole and at least one electric coil.

5. The power conversion device of claim 4 wherein each stator segment is removably attached to the housing.

6. The power conversion device of claim 4 wherein the stator segments are isolated from fluid by encapsulation with a non-metallic compound.

7. The power conversion device of claim 1 further including a circumferential band holding the at least one magnet to the rotor.

8. The power conversion device of claim 1 wherein the at least one magnet is encapsulated with a non-metallic compound.

9. The power conversion device of claim 1 wherein the rotor includes rotor segments and each rotor segment has at least one rotor blade and a shroud segment.

10. The power conversion device of claim 9 wherein the shroud segments each have at least one magnet.

11. The power conversion device of claim 1 including at least one cooling duct.

12. The power conversion device of claim 11 whereby the cooling fluid flowing through the at least one cooling duct is at least one of the fluid flowing through the power conversion device and an alternate fluid from a separate source.

13. The power conversion device of claim 11 whereby the at least one cooling duct is in the housing.

14. The power conversion device of claim 11 further including a cooling insert which includes the at least one cooling duct and surrounds the stator.

15. The power conversion device of claim 14 wherein the at least one commutation control device is attached to the cooling insert, and the cooling insert, the stator and the at least one commutation control device are isolated from the fluid by encapsulation with a non-metallic compound.

16. The power conversion device of claim 14 wherein the stator and the at least one cooling insert are isolated from the fluid flowing through the power conversion device by encapsulation with a non-metallic compound.

17. The power conversion device of claim 14 wherein (i) the stator includes at least two stator segments, (ii) each cooling insert includes at least one cooling insert segment attached to each stator segment, (iii) each stator segment has at least one pole and at least one electric coil, and (iv) each cooling insert segment has at least one cooling duct.

18. The power conversion device of claim 17 wherein the at least one commutation control device is attached to the at least one cooling insert segment, and each stator segment and the at least one commutation control device are isolated from the fluid by encapsulation with a non-metallic compound.

19. The power conversion device of claim 17 wherein the at least two stator segments and the cooling insert segments are isolated from the fluid flowing through the power conversion device by encapsulation with a non-metallic compound.

20. The power conversion device of claim 1 wherein the at least one commutation control device links the electric coils directly to the external power leads.

21. The power conversion device of claim 1 wherein the at least one commutation control device controls the torque between the rotor and the stator by controlling the electric current through the at least one electric coil.

22. The power conversion device of claim 1 wherein the at least one commutation control device is configured to control fluid flow rate by controlling rotor rotational speed.

23. The power conversion device of claim 1 wherein the at least one commutation control device is configured to substantially maximize the product of torque and rotor rotational speed as the fluid flow rate varies.

24. The power conversion device of claim 1 further including an electric load bank and the commutation control device is configured to control the electric current to the external power leads and the load bank to keep the torque load on the rotor substantially constant as the load on the external power leads varies.

25. The power conversion device of claim 24 wherein the load bank is located in the at least one stator vane.

26. The power conversion device of claim 1 wherein the at least one commutation control device is cooled by at least one of the housing and the diffuser.

27. The power conversion device of claim 1 including a track and hoist configured to transport the power conversion device between an operating position and a service position.

28. The power conversion device of claim 27 wherein the track and hoist are configured to rotate the power conversion device about an axis perpendicular to the rotational axis of the rotor.

29. The power conversion device of claim 27 further including at least one quick-release fluid-conduit connecting clamp configured to facilitate the transfer of the power conversion device between the operating position and the service position.

30. The power conversion device of claim 1 including a track and carriage configured to transport the power conversion device from an operating position to a service position.

31. The power conversion device of claim 1 further including a penstock connected to the first fluid conduit to direct fluid to the device from an upstream fluid reservoir through the power conversion device and the second fluid conduit to a downstream fluid reservoir.

32. The power conversion device of claim 31 also including an electric current source, the current source and the at least one commutation control device being configured to operate the power conversion device in a pump mode and a power generating mode, the pump mode including the application of electric current to the external power leads, causing a magnetic field to drive the rotor and pump fluid up the penstock to the upstream fluid reservoir, thereby converting electrical energy to stored hydraulic energy which is later converted back to electrical energy when the power conversion device operates in power generation mode.

33. The power conversion device of claim 31 wherein the penstock is configured to operate as a siphon to connect the upper reservoir to the first fluid conduit.

34. The power conversion device of claim 33 also including an electric current source, the current source and the at least one commutation control device being configured to operate the power conversion device in a pump mode and a power generating mode, the pump mode including the application of electric current to the external power leads, causing a magnetic field to drive the rotor and pump fluid up the penstock to prime the siphon.

35. The power conversion device of claim 33 further including a shut-off valve placed between the first fluid conduit and the penstock and a fluid supply valve placed in the penstock such that when the shut-off valve is closed and fluid is supplied through the fluid supply valve, the penstock fills with fluid until the siphon is primed, and when the shut-off valve opens, the power conversion device operates in power generation mode.

36. The power conversion device of claim 33 further including a vacuum pump to prime the siphon by drawing a vacuum at substantially the highest point of the penstock.

37. The power conversion device of claim 1 wherein the device is placed over an opening in a weir.

38. The power conversion device of claim 1 further including at least one auxiliary turbine in at least one of upstream and downstream positions in relation to the power conversion device and having at least one drive shaft rotatably connecting the power conversion device rotor to an at least one rotor of the at least one auxiliary turbine, whereby the at least one auxiliary turbine drives the rotor of the power conversion device.

39. The power conversion device of claim 1 also including an electric current source, the current source and the at least one commutation control device being configured to operate the power conversion device in a pump mode and a power generating mode, the pump mode including the application of electric current to the external power leads, causing a magnetic field to drive the rotor and pump fluid from the second fluid conduit, through the housing, diffuser and first fluid conduit, thereby converting electric power to hydraulic power while operating in pump mode.

40. A power conversion device comprising:
a first fluid inlet;
a diffuser with (a) at least one vane supporting a hub of the diffuser and (b) a rotor rotatably supported by the hub of the diffuser and having (i) rotor blades, (ii) a rotor hub, and (iii) a shroud at the periphery of the rotor, the shroud including at least one magnet mounted thereto;
a housing surrounding the shroud and having a rigidly-attached stator including laminations, a plurality of poles, and at least one electric coil;
a fluid-lubricated bearing integral with the stator and supporting the rotor and having lubrication slots located between the poles; and
a source of electric current connected to the at least one electric coil,
whereby the electric current generates a magnetic field producing a torque on the at least one magnet, rotating the rotor and causing the rotor blades to pump fluid through the housing, the diffuser and the fluid inlet, thereby converting electric power to hydraulic power.

41. The power conversion device of claim 40 including a track and hoist configured to transport the power conversion device between an operating position and a service position.

42. The power conversion device of claim 41 wherein the track and hoist are configured to rotate the power conversion device about an axis perpendicular to the rotational axis of the rotor.

43. The power conversion device of claim 41 further including at least one quick-release fluid-conduit connecting clamp configured to facilitate the transfer of the power conversion device between the operating position and the service position.

44. The power conversion device of claim 40 including a track and carriage configured to transport the power conversion device from an operating position to a service position.

45. The power conversion device of claim 40 wherein the diffuser is removably attached to the housing.

46. The power conversion device of claim 40 wherein the stator is removably attached to the housing.

47. The power conversion device of claim 40 wherein the stator includes at least two stator segments, each segment having at least one pole and at least one electric coil.

48. The power conversion device of claim 47 wherein each stator segment is removably attached to the housing.

49. The power conversion device of claim 47 wherein the stator segments are isolated from fluid by encapsulation with a non-metallic compound.

50. The power conversion device of claim 40 further including a circumferential band holding the at least one magnet to the rotor.

51. The power conversion device of claim 40 wherein the at least one magnet is encapsulated with a non-metallic compound.

52. The power conversion device of claim 40 wherein the rotor includes rotor segments and each rotor segment has at least one rotor blade and a shroud segment.

53. The power conversion device of claim 52 wherein the shroud segments each have at least one magnet.

54. The power conversion device of claim 40 including at least one cooling duct.

55. The power conversion device of claim 54 whereby the cooling fluid flowing through the at least one cooling duct is at least one of the fluid flowing through the power conversion device and an alternate fluid from a separate source.

56. The power conversion device of claim 54 whereby the at least one cooling duct is in the housing.

57. The power conversion device of claim 54 further including a cooling insert which includes the at least one cooling duct and surrounds the stator.

58. The power conversion device of claim 57 wherein the stator and the at least one cooling insert are isolated from the fluid flowing through the power conversion device by encapsulation with a non-metallic compound.

59. The power conversion device of claim 57 wherein (i) the stator includes at least two stator segments, (ii) the cooling insert includes at least one cooling insert segment attached to each stator segment, (iii) each stator segment has at least one pole and at least one electric coil, and (iv) each cooling insert segment has at least one cooling duct.

60. The power conversion device of claim 59 wherein the at least two stator segments and the cooling insert segments are isolated from the fluid flowing through the power conversion device by encapsulation with a non-metallic compound.

61. A power conversion device comprising:
a first fluid conduit;
a diffuser attached to the first fluid conduit and having at least one vane supporting a hub of the diffuser;
a rotor rotatably supported by the hub of the diffuser and having at least one rotor blade, a rotor hub, and a shroud at the periphery of the rotor, the shroud having at least one magnet mounted thereto;
a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil;
at least one commutation control device connected to the at least one electric coil and having external power leads;
a fluid-lubricated bearing integral with the stator and having lubrication slots located between the poles;
a second fluid conduit attached to the housing; and
an electric power source,
whereby the application of electric current from the electric power source to the external power leads causes a magnetic field to drive the rotor and pump fluid from the second fluid conduit, through the housing, diffuser and first fluid conduit, thereby converting electric power to hydraulic power.

62. The power conversion device of claim 61 wherein the at least one commutation control device links the electric coils directly to the external power leads.

63. The power conversion device of claim 61 wherein the at least one commutation control device controls the torque between the rotor and the stator by controlling the electric current through the at least one electric coil.

64. The power conversion device of claim 61 wherein the at least one commutation control device is configured to control fluid flow rate to control rotor rotational speed.

65. The power conversion device of claim 61 wherein the at least one commutation control device is cooled by at least one of the housing and the diffuser.

66. The power conversion device of claim 61 wherein the at least one commutation control device is attached to a cooling insert, and the cooling insert, the stator and the at least one commutation control device are isolated from the fluid by encapsulation with a non-metallic compound.

67. The power conversion device of claim 66 wherein the at least one commutation control device is attached to at least one cooling insert segment, and each stator segment and the at least one commutation control device are isolated from the fluid by encapsulation with a non-metallic compound.

68. A power conversion system providing electric power to at least one external load, the system having a plurality of power conversion devices in fluid series and a system controller, each power conversion device comprising:
a first fluid conduit;
a diffuser attached to the first fluid conduit and having at least one vane supporting a hub of the diffuser;
a rotor rotatably supported by the hub of the diffuser and having at least one rotor blade, a rotor hub, and a shroud at the periphery of the rotor, the shroud having at least one magnet mounted thereto;
a housing surrounding the shroud and attached to the diffuser, the housing having a stator including laminations forming poles and at least one electric coil around the poles, the stator being encapsulated in a non-metallic compound such that fluid is prevented from contacting the laminations and the at least one electric coil;
at least one commutation control device connected to the at least one electric coil and having external power leads connected to at least one external load; and
a second fluid conduit attached to the housing,
and the system controller is configured to apportion the electric power to the at least one external load among the plural power conversion devices.

69. The power conversion system of claim 68 whereby the rotors are connected by at least one drive shaft, rotatably coupling the rotors.

* * * * *

UNITED STATES PATENT AND TRADEMARK OFFICE
CERTIFICATE OF CORRECTION

PATENT NO. : 8,963,356 B2  
APPLICATION NO. : 13/356288  
DATED : February 24, 2015  
INVENTOR(S) : Paul W. Roos Page 1 of 1

It is certified that error appears in the above-identified patent and that said Letters Patent is hereby corrected as shown below:

On the title page, item (73), Assignee, delete "America" and insert --American--.

Signed and Sealed this
Sixth Day of October, 2015

Michelle K. Lee
*Director of the United States Patent and Trademark Office*